(12) United States Patent
Ichii et al.

(10) Patent No.: US 8,305,461 B2
(45) Date of Patent: Nov. 6, 2012

(54) INFORMATION DISPLAY DEVICE

(75) Inventors: Nobuhiko Ichii, Osaka (JP); Ryo Sakaji, Osaka (JP); Masahiro Shioji, Osaka (JP); Yurie Sakai, Osaka (JP); Yoshinori Hama, Kyoto (JP); Kazuto Yoshii, Osaka (JP); Nobuaki Kanazawa, Hyogo (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 446 days.

(21) Appl. No.: 12/188,509

(22) Filed: Aug. 8, 2008

(65) Prior Publication Data

US 2009/0040357 A1  Feb. 12, 2009

(30) Foreign Application Priority Data

Aug. 8, 2007 (JP) ................ 2007-207285
Aug. 29, 2007 (JP) ................ 2007-223303
Sep. 7, 2007 (JP) ................ 2007-232274

(51) Int. Cl.
*H04N 5/76* (2006.01)
*H04N 5/222* (2006.01)

(52) U.S. Cl. ............. 348/231.2; 348/231.3; 348/333.02; 348/333.12

(58) Field of Classification Search ........... 348/333.01–333.12, 231.2, 231.3
See application file for complete search history.

(56) References Cited

U.S. PATENT DOCUMENTS

| | | | |
|---|---|---|---|
| 5,191,372 A | 3/1993 | Aihara | |
| 5,903,309 A * | 5/1999 | Anderson | 348/333 |
| 6,310,648 B1 * | 10/2001 | Miller et al. | 348/333.05 |
| 6,636,197 B1 | 10/2003 | Goldenberg et al. | |
| 7,171,243 B2 | 1/2007 | Watanabe et al. | |
| 7,409,411 B2 | 8/2008 | Sato | |
| 7,456,877 B2 * | 11/2008 | Onuki | 348/241 |
| 7,561,900 B2 | 7/2009 | Watanabe et al. | |
| 7,576,789 B2 * | 8/2009 | Miura | 348/333.01 |

(Continued)

FOREIGN PATENT DOCUMENTS

JP 02-207232 A 8/1990

(Continued)

OTHER PUBLICATIONS

U.S. Office Action of Related U.S. Appl. No. 12/188,456, mailing date of Dec. 27, 2010.

(Continued)

*Primary Examiner* — Jason Whipkey
*Assistant Examiner* — Marly Camargo
(74) *Attorney, Agent, or Firm* — Westerman, Hattori, Daniels & Adrian, LLP

(57) ABSTRACT

The present invention provides an information display device including an imaging unit that executes an imaging process to image a subject to output an imaging signal; a monitor capable of displaying an image of the subject based on the imaging signal; a switching part located near the monitor; a first display controller for displaying, in a menu on the monitor, each of a first group of items consisting of a plurality of items associated with the imaging process, whereby first setting data can be set; and a second display controller for displaying, in a menu on the monitor, each of a second group of items associated with a plurality of particular items in the first group and having fewer items than the first group, whereby second setting data can be set, wherein switching between the first and second display controllers is performed by operating the switching part.

2 Claims, 16 Drawing Sheets

U.S. PATENT DOCUMENTS

| | | |
|---|---|---|
| 7,814,434 B2 | 10/2010 | Nakashima |
| 2004/0070594 A1 | 4/2004 | Burke |
| 2004/0214541 A1 | 10/2004 | Choi |
| 2006/0209036 A1 | 9/2006 | Shin et al. |
| 2006/0212828 A1 | 9/2006 | Yahiro et al. |
| 2007/0030362 A1 | 2/2007 | Ota et al. |
| 2007/0104461 A1 | 5/2007 | Cho |
| 2007/0188647 A1* | 8/2007 | Ikeda ..................... 348/333.11 |
| 2008/0180549 A1* | 7/2008 | Lee et al. ................ 348/231.2 |
| 2009/0225179 A1* | 9/2009 | Ohashi et al. ............ 348/222.1 |
| 2010/0088643 A1 | 4/2010 | Ota et al. |

FOREIGN PATENT DOCUMENTS

| | | | |
|---|---|---|---|
| JP | 09-305361 A | | 11/1997 |
| JP | 11-331646 A | | 11/1999 |
| JP | 2003-058292 A | | 2/2003 |
| JP | 2004-274135 A | | 9/2004 |
| JP | 2004274135 | * | 9/2004 |
| JP | 2004-333816 A | | 11/2004 |
| JP | 2004-348692 A | | 12/2004 |
| JP | 2005-175616 A | | 6/2005 |
| JP | 2006-171107 A | | 6/2006 |

OTHER PUBLICATIONS

Japanese Office Action dated May 24, 2011, issued in corresponding Japanese Patent Application No. 2007-232275. English language translation.

Chinese Office Action dated May 25, 2011, issued in corresponding Chinese Patent Application No. 200810129809.9 Partial English translation.

Chinese Office Action dated Aug. 31, 2011, issued in corresponding Chinese Patent Application No. 200810129801.2. Partial English Translation.

Japanese Office Action issued Jun. 28, 2011 in related Japanese Patent Application No. 2007-232274. English translation.

Office Action dated Jul. 6, 2011, issued in related U.S. Appl. No. 12/188,456.

Japanese Office Action mailed Mar. 27, 2012, issued in corresponding Japanese Patent Application No. 2007-232274, with full English translation.

* cited by examiner

FIG. 4
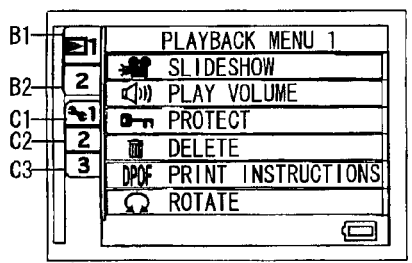
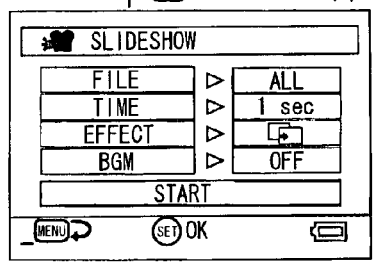
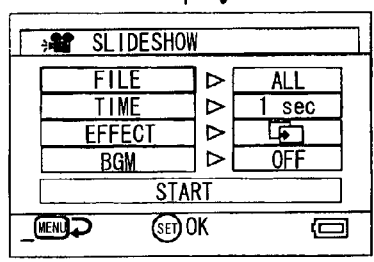 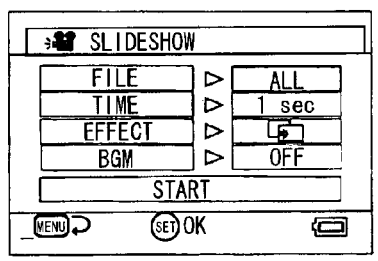
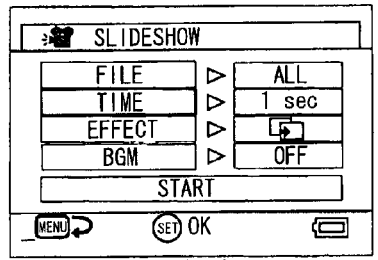 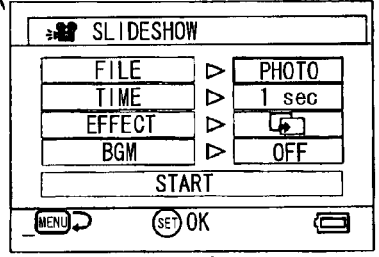
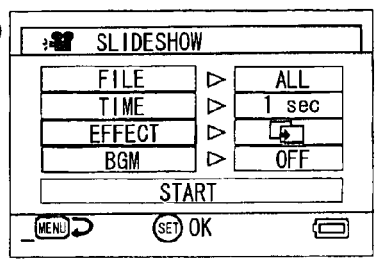 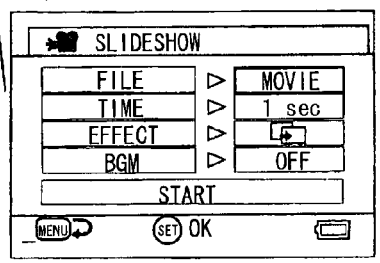

INFORMATION DISPLAY DEVICE

The priority applications Number 2007-207285, 2007-223303, and 2007-232274, upon which this patent application is based, are hereby incorporated by reference.

BACKGROUND OF THE INVENTION

1. Field of the Invention

The present invention relates to information display devices with an image display function, such as electronic cameras such as digital cameras, for example, and particularly to information display devices in which the menu display of various items of control information is controlled.

2. Description of Related Art

In order to set a conventional electronic camera to desired recording conditions (resolution, AE value, ISO, etc.), a user displays a recording conditioning menu on a monitor disposed in the camera, and selects a desired item from the displayed items. In order to set desired playback conditions, the user displays a playback conditioning menu on the monitor, and selects a desired item from the displayed items.

In recent years, there have been increased recording conditions and playback conditions that users can select and set. However, because the number of items that can be displayed on the monitor is limited, the items are often displayed on the screen in a hierarchical structure. Users select a desired item by performing a selection operation several times, and set recording conditions and playback conditions in accordance with the selected menu item. In setting recording conditions with such menus of hierarchical structure, it is possible to display higher hierarchies of the recording setting menu items in a horizontal direction, and display sub-hierarchies in a vertical direction.

However, even such a menu display may require relatively many times of selection operation to select a desired item. In addition, great many items are displayed. Accordingly, it takes time for the user to select a desired item. A user not used to the operation would feel very stressful because of the complicatedness. In the case where a skilled user performs a recording operation, setting his or her preference from among many items is not particularly stress if he or she is not in a hurry, but the selection operation can be very troublesome if the user wants to select recording conditions and perform recording immediately.

SUMMARY OF THE INVENTION

An object of the present invention is to provide an information display device that a user can more easily set to recording conditions or playback conditions in conformity with the use condition.

The present invention provides an information display device including an imaging unit that executes an imaging process to image a subject to output an imaging signal; a monitor capable of displaying an image of the subject based on the imaging signal; a switching part located near the monitor; a first display controller for displaying, in a menu on the monitor, each of a first group of items consisting of a plurality of items associated with the imaging process, whereby first setting data can be set; and a second display controller for displaying, in a menu on the monitor, each of a second group of items associated with a plurality of particular items in the first group and having fewer items than the first group, whereby second setting data can be set, wherein switching between the first and second display controllers is performed by operating the switching part.

With this information display device of the present invention, the menu display on the monitor is switched between the first group of items and the second group of items. The user can thus more easily set recording conditions in conformity with the use condition. In addition, since the switching part is located near the monitor, the user can extremely easily switch the screen to the menu most suitable for the situation while viewing the display screen on the monitor.

In a specific configuration, the monitor and switching part are arranged on a finder unit provided to the device so as to be displaced between a closed position and an open position. When the finder unit is in the closed position, the monitor and switching part are not exposed. When the finder unit is in the open position, the monitor and switching part are exposed.

With this specific configuration, since the monitor and switching part are arranged on a finder unit provided to the device so as to be displaced between a closed position and an open position, switching is possible with the finder unit being in the open position. The user can therefore operate the switching part in conformity with the usage while viewing the through-the-lens image being captured. This allows easier setting of recording conditions without complicated operations. Since the switching part is only used in menu display on the monitor, and does not need to be operated when the monitor is not used, the switching part, as well as the monitor, is not exposed when the finder unit is positioned in the closed position, preventing the user from operating the switching part unnecessarily.

The present invention provides another information display device including a playback unit that executes a playback process to play back data recorded on a recording medium to output it as playback data; a monitor capable of displaying a playback image based on the playback data; a switching part located near the monitor; a first display controller for displaying, in a menu on the monitor, each of a first group of items consisting of a plurality of items associated with the playback process, whereby first setting data can be set; and a second display controller for displaying, in a menu on the monitor, each of a second group of items associated with a plurality of particular items in the first group and having fewer items than the first group, whereby second setting data can be set, wherein switching between the first and second display controllers is performed by operating the switching part.

With this information display device of the present invention, the menu display on the monitor is switched between the first group of items and the second group of items. The user can thus more easily set playback conditions in conformity with the use condition. In addition, since the switching part is located near the monitor, the user can extremely easily switch the screen to the menu most suitable for the situation while viewing the display screen on the monitor.

In a specific configuration, the monitor and switching part are arranged on a movable unit provided to the device so as to be displaced between a closed position and an open position. When the movable unit is in the closed position, the monitor and switching part are not exposed. When the movable unit is in the open position, the monitor and switching part are exposed.

Accordingly, since the monitor and switching part are arranged on a movable unit provided to the device so as to be displaced between a closed position and an open position, switching is possible with the movable unit being in the open position. The user can therefore operate the switching part in conformity with the usage while viewing the through-the-lens image being captured. This allows easier setting of recording conditions without complicated operations. Since the switching part is only used in menu display on the monitor, and does not need to be operated when the monitor is not used, the switching part, as well as the monitor, is not exposed when the movable unit is positioned in the closed position, preventing the user from operating the switching part unnecessarily.

The present invention provides still another information display device including a menu switcher for switching between a first menu mode in which a first group of items is displayed in a menu on a monitor, and one of certain first candidates of data can be selected as first control data for each of the items, and a second menu mode in which a second group consisting of fewer items than the first group is displayed in a menu on the monitor, and one of certain second candidates of data can be selected as second control data for each of the items; and a controller for controlling the operation of the device on the basis of the first control data or second control data, wherein the second group of items includes an item having a second candidate of data that is a combination of first candidates of data for a plurality of particular items of the first group.

With this information display device of the present invention, in the second menu mode, which is simpler than the first menu mode, which provides a detailed menu display, certain candidates of data associated with a plurality of items of the first menu mode are combined and displayed in a single item of the second menu mode. The number of items for setting the control data can thus be substantially maintained as many as possible even though the menu display is simplified.

In a specific construction, the information display device includes an imager for taking a still image of a subject in response to imaging instructions in a still image taking mode, and for taking a moving image of a subject in response to imaging instructions in a moving image taking mode, wherein the first group of items includes a group of moving image items associated with recording conditions for the moving image and a group of still image items associated with recording conditions for the still image, wherein the second candidate of data is the data that is a combination of each first candidate of data selected from the group of moving image items and from the group of still image items.

Since the second candidate of data is the data made from the group of moving image items and the group of still image items, there is no need to prepare two kinds of items for moving image recording and still image recording. This reduces selection items and allows recording conditions to be extremely easily set by selecting one of the second candidates of data.

In a further specific configuration of this information display device, the plurality of particular items include an item associated with the resolution included in the group of moving image items and an item associated with the aspect ratio included in the group of still image items.

Since the second candidate of data is the data that is a combination of the item associated with the resolution included in the group of moving image items and the item associated with the aspect ratio included in the group of still image items, in setting conditions in recording a moving image or still image, recording conditions corresponding to each playback requirement and preferable for the user can be set easily and quickly.

As described above, with the information display device of the present invention, recording conditions can be more easily set in conformity with the use condition. In addition, the user can certainly realize the most suitable menu switching while viewing the display screen.

In the information display device including the above-described specific features, since the monitor and switching part are disposed on the finder unit or movable unit, when the monitor is not used and not exposed, the switching part is not exposed either, preventing unnecessary operations of the switching part.

When the switching is performed from the menu display with many items to the menu display with fewer items, although the number of items displayed in a menu is reduced, more items than those of the displayed mode can be maintained for setting control data.

BRIEF DESCRIPTION OF THE DRAWINGS

FIG. 4 shows playback normal menu displays of the electronic camera that is an embodiment of the present invention;

DETAILED DESCRIPTION OF THE INVENTION

Figure 1:
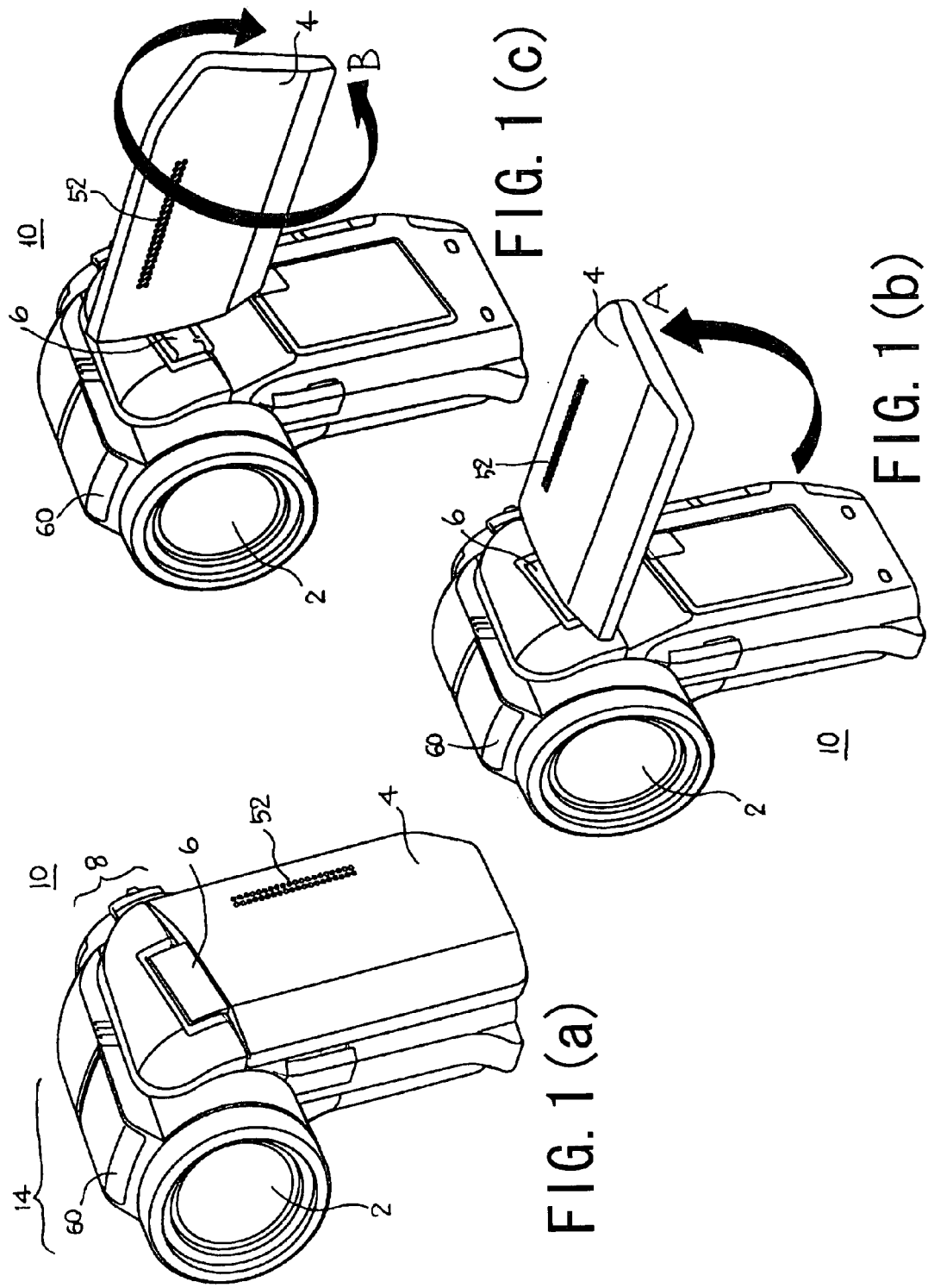
FIG. 1 includes perspective views showing appearances of an electronic camera that is an embodiment of the present invention.
Figure 2:
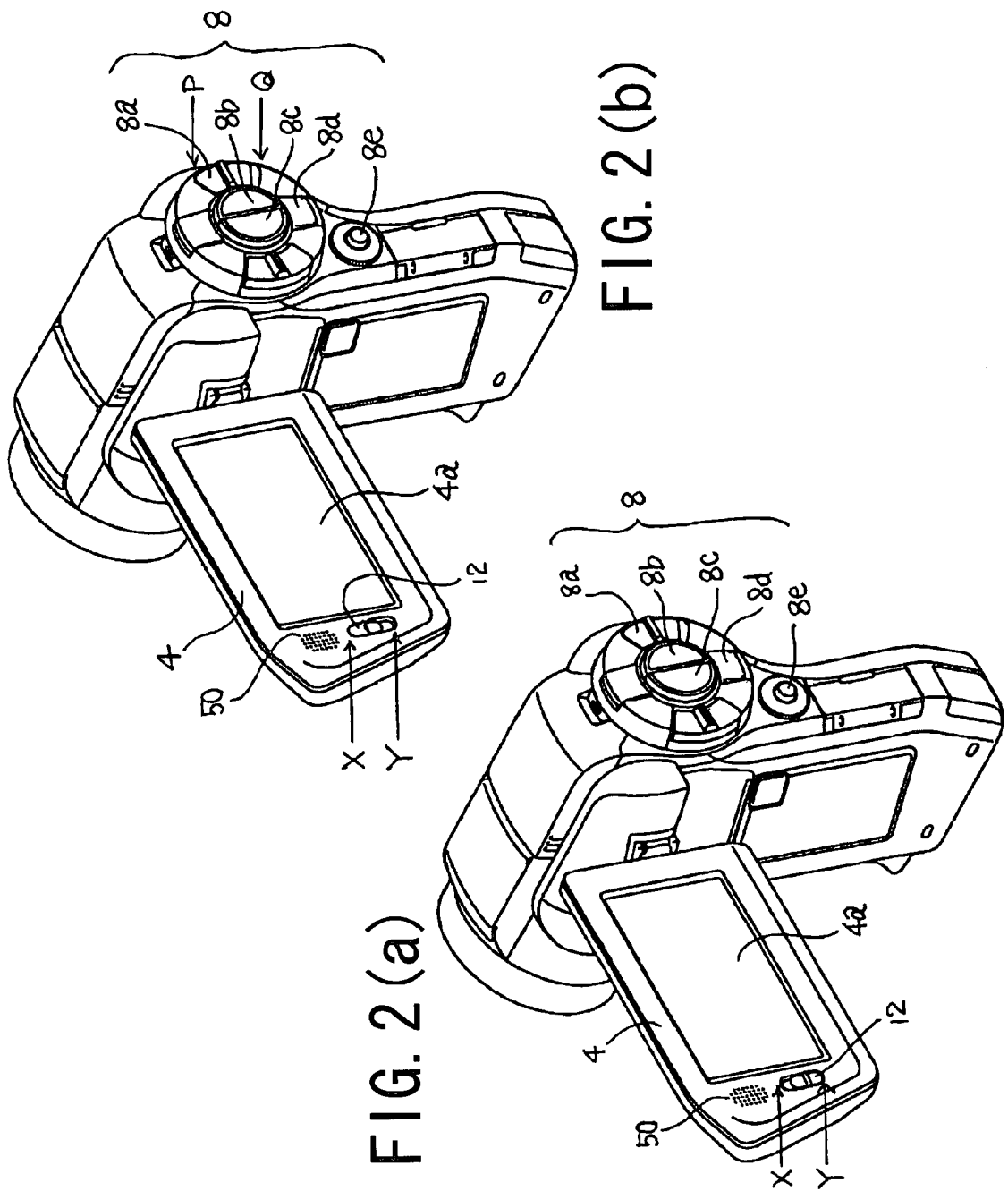
FIG. 2 includes perspective views showing other appearances of the electronic camera that is an embodiment of the present invention.

In this embodiment, an electronic camera 10 is described as an example of the information display device. Appearances of the electronic camera 10 are shown in FIG. 1 and FIG. 2. FIGS. 1(a)-(c) are perspective views showing the front of the electronic camera 10, and FIGS. 2(a) and (b) are perspective views showing the rear of the electronic camera 10.

As shown in FIG. 1 and FIG. 2, the electronic camera 10 includes an imaging unit 14 including at least a lens 2, a finder unit 4 including a monitor 4a and a menu change-over switch 12, a hinge part 6, operation buttons 8a-8e, a speaker 50, a microphone 52 and a strobe flash 60.

FIG. 1(a) shows the device with the finder unit 4 being closed onto the main body having the imaging unit 14, so that the monitor 4a and menu change-over switch 12 are not exposed. Usually, users do not perform imaging operations in such a form. FIG. 1(b) shows the device with the monitor 4a being located generally perpendicularly to the main body by pivoting the finder unit 4 on the biaxial hinge part 6 in the direction of arrow A, and FIG. 1(c) shows the device with the monitor 4a being located generally parallel to the lens 2 of the main body by further rotating the finder unit 4 on the hinge part 6 in arrow direction B from the state of FIG. 1(b).

FIGS. 2(a) and (b) show the rear of FIG. 1(c). The menu change-over switch 12 is provided near the monitor 4a so as to be slidable between the upper and lower positions (X, Y). The monitor 4a displays playback images and the through-the-lens image (image being taken), and plays the same role as a finder for a user. When the menu change-over switch 12 is in the X position (upper position) as shown in FIG. 2(a), the device is in the simple menu mode described below, which makes it easy to set the recording menu and playback menu. When the menu change-over switch 12 is in the Y position (lower position), the device is in the normal menu mode described below, which allows normal menu setting operations.

The numerals 8a-8e constituting an operation unit 8 are described in detail. The numeral 8a is a recording/playback change-over switch for switching the operation mode to either the recording mode or playback mode. Moving 8a to the P position (upper position) sets the recording mode, and moving it to the Q position (lower position) sets the playback mode. The numeral 8b is a moving image recording start button for starting a moving image recording process of the imaging unit 14 by depressing 8b. The numeral 8c is a still image recording button for instructing a still image recording process. The numeral 8d is a menu button, and displays selectable menu setting items on the monitor 4a when depressed. The numeral 8e is a cursor key made so as to be inclined in one of the four, upward, downward, rightward, and leftward directions when it is manually operated in the one direction, and to return to the original neutral position from the inclined state when the manual operation is released. Operating the key in one of the four directions allows selection and indication of an item displayed on the monitor 4a. The cursor key 8e is also used as a set key, and depressed when in the neutral position to perform a set operation to select an item and set the selected item.

Figure 3:
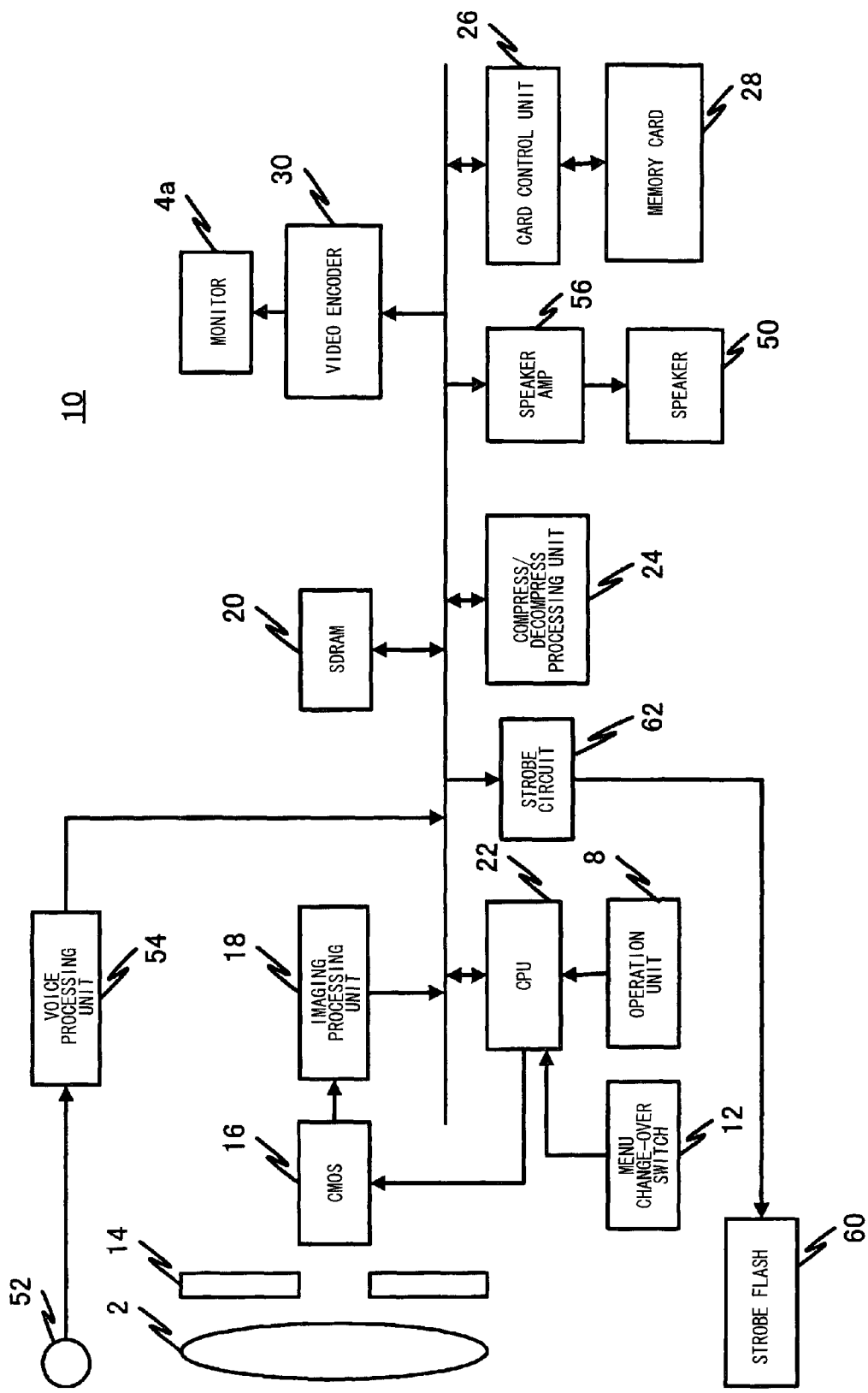
FIG. 3 is a block diagram showing a configuration of the electronic camera that is an embodiment of the present invention.

Next, an operation of the electronic camera is described in more detail using FIG. 3, which is a block diagram inside the electronic camera 10 shown in FIG. 1 and FIG. 2. The electronic camera 10 includes an imaging lens 2, a monitor 4a, an operation unit 8, a menu change-over switch 12, an aperture mechanism 14, a CMOS image sensor 16, an imaging processing unit 18, an SDRAM 20, a CPU 22, a compression/decompression processing unit 24, a card control unit 26, a memory card 28, a video encoder 30, a speaker 50, a microphone 52, a voice processing unit 54, a speaker amp 56, a strobe flash 60 and a strobe circuit 62.

The imaging lens 2 images an optical image of a subject on the imaging area of the CMOS image sensor 16, which is an image pickup device. The location of the imaging lens 2 in the optical axis directions is adjusted on the basis of output signals of the CMOS image sensor 16. The aperture mechanism 14 is controlled to thereby regulate the light that enters the CMOS image sensor 16 from the imaging lens 2. Such adjustments of the imaging lens 2 and aperture 14 are made by a motor drive unit not illustrated.

Analog imaging signals output from the CMOS image sensor 16 are variously processed by the imaging processing unit 18 and, as a result, converted to Y signals, which are a luminance signal, and to U and V signals, which are a color-difference signal.

The CPU 22 is connected to the operation unit 8, menu change-over switch 12, imaging processing unit 18, SDRAM 20, compression/decompression processing unit 24, card control unit 26, video encoder 30, voice processing unit 54, speaker amp 56 and strobe circuit 62. The CPU 22 controls the imaging processing unit 18, SDRAM 20, compression/decompression processing unit 24, card control unit 26, video encoder 30, voice processing unit 54, speaker amp 56 and strobe circuit 62 in accordance with a program stored in an internal memory not illustrated.

Next, an operation of the electronic camera 10 performed by operating the operation unit 8 is described. As described above, the operation unit 8 includes various buttons or keys 8a-8e. When the recording/playback change-over switch 8a is moved to the P position and in the recording mode, the CPU 22 outputs the through-the-lens image onto the monitor 4a. When the moving image recording start button 8b or still image recording button 8c is then depressed, the CPU 22 performs a moving image recording process or still image recording process. In the case of a shooting operation with the still image button 8c, the strobe flash 60 operates in accordance with the flash mode, which is a shooting condition. The moving image or still image taken are compressed in the compression/decompression processing unit 24 with the H264 codec for moving images or the JPEG codec for still images. The CPU 22 controls the card control unit 26 to thereby record the compressed moving image data or still image data onto the memory card 28 as a moving image file or a still image file. The SDRAM 20 is used to temporarily store the data when such an imaging process is performed.

When voice recording is set with the operation unit 8, voice is taken in from the microphone 52, and converted by the voice signal processing unit 54 to digital voice data, which is compressed in the compression/decompression processing unit 24, and recorded onto the memory card 28 as an audio file.

When the recording/playback change-over switch 8a is moved to the Q position and in the playback mode, the CPU 22 plays back a moving image file or still image file recorded on the memory card 28 on the monitor 4a. An audio file is also played back and output to the speaker 50. Specifically, a user selects a moving image file, still image file or audio file recorded on the memory card 28, and then the selected file is decompressed in the compression/decompression processing unit 24, converted by a D/A converter not illustrated to an analog image signal or analog voice signal, which is formed into an output image signal in the video encoder 30 or amplified in the speaker amp 56 to generate a voice signal, and displayed on the monitor 4a or output to the speaker 50.

In performing the above-described recording operation and playback operation, the user can set desired recording conditions and playback conditions. Specifically, the user moves the menu change-over switch 12 to the X position or Y position, and depresses the menu button 8d to thereby display a menu screen on the monitor 4a. The user operates the cursor key 8e in the four directions in order to set each item to meet desired recording conditions and playback conditions, and depresses the key to enter the setting, thereby making various settings.

Figure 9:
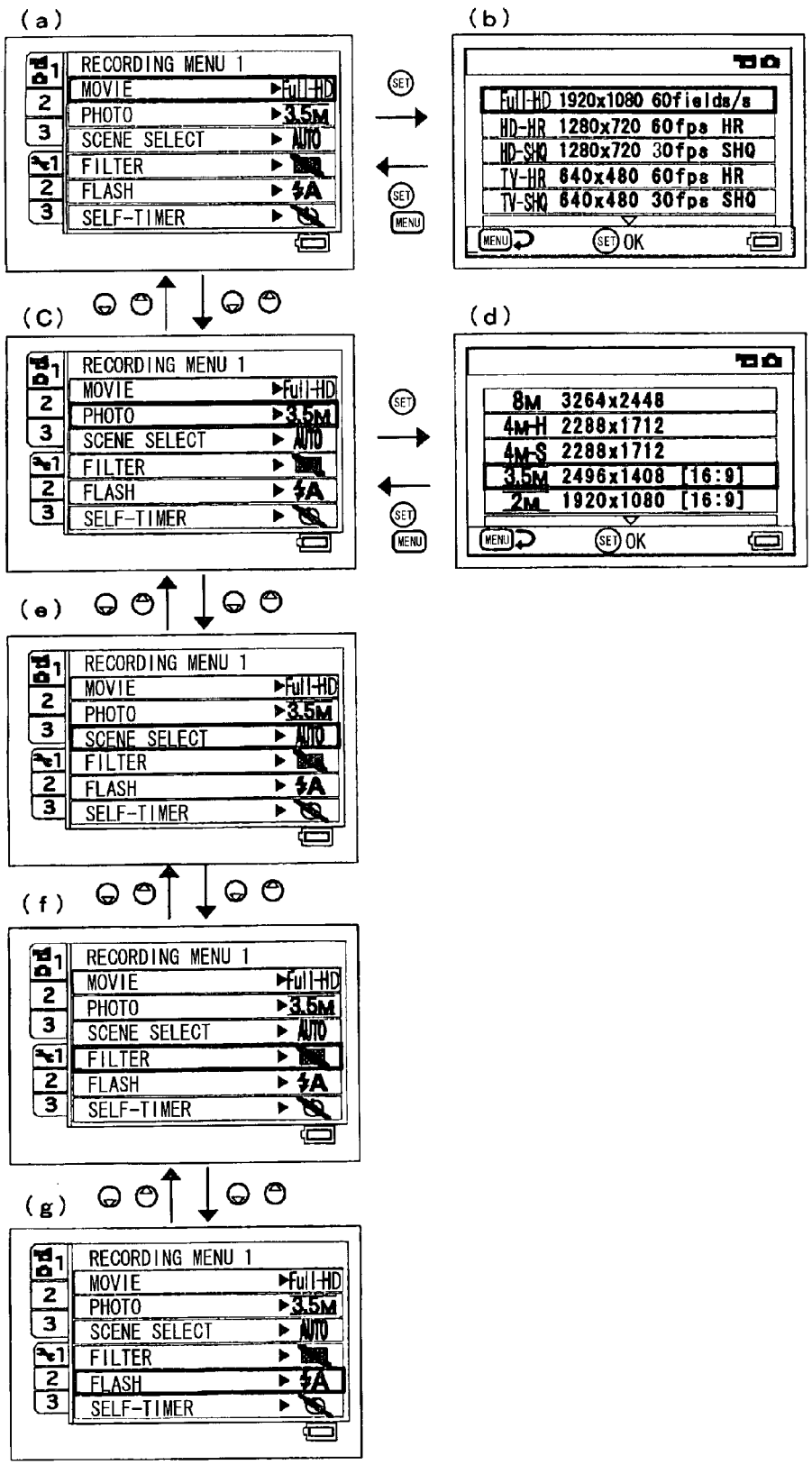
FIG. 9 shows recording normal menu displays of the electronic camera that is an embodiment of the present invention.
Figure 10:
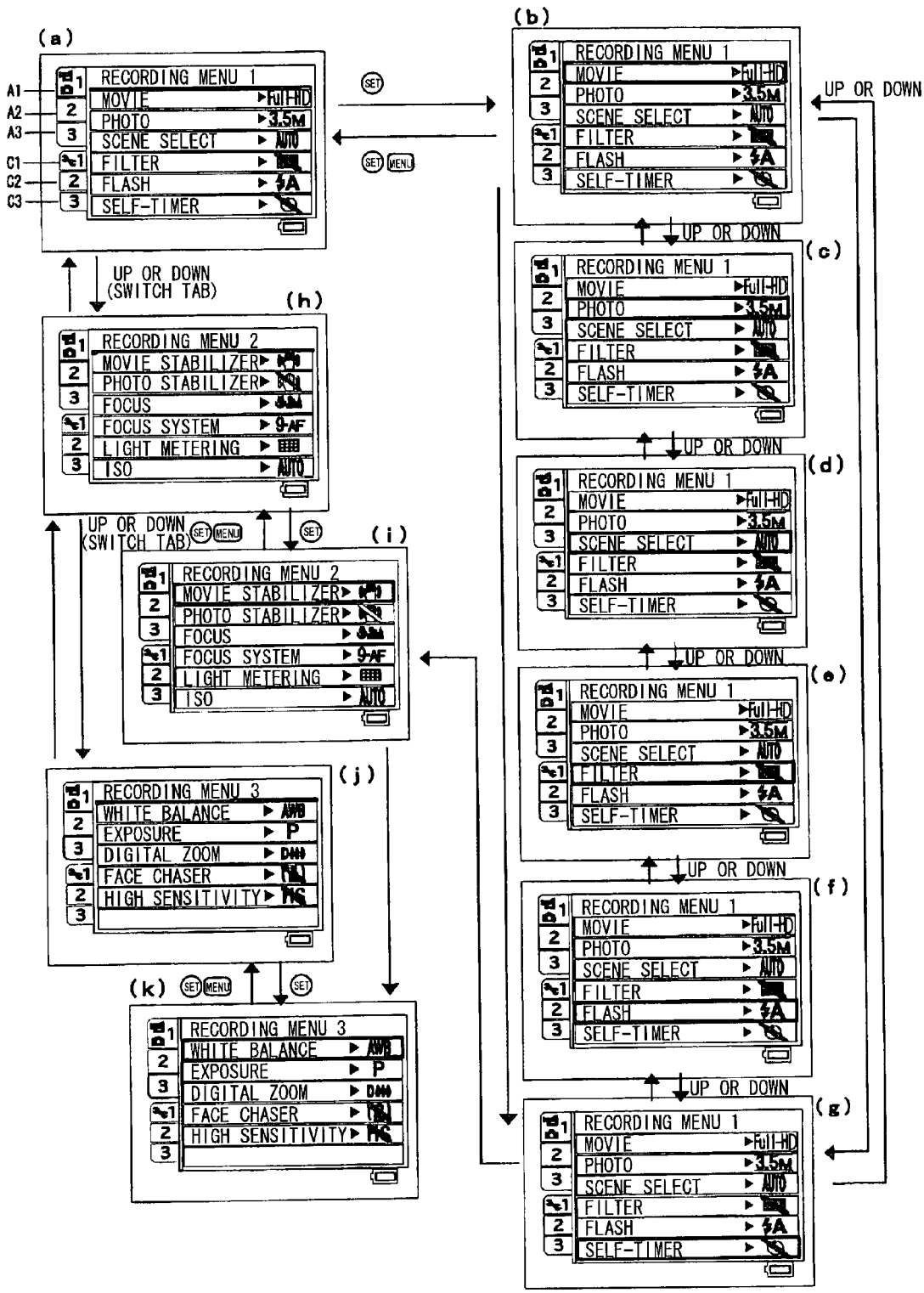
FIG. 10 shows transitions in the recording normal menu of the electronic camera that is an embodiment of the present invention.

A menu setting operation is described below in detail with reference to FIG. 9 and FIG. 10. When the user moves the menu change-over switch 12 to the Y position and depresses the menu button 8d while the camera is in the recording mode, the monitor 4a displays a recording menu selection screen in the normal menu mode shown in FIG. 10. Recording menu selection items in the normal menu mode are selection items normally prepared in recent electronic cameras.

Since many items are prepared in the normal menu mode in the recording mode, it is difficult for the one screen of the monitor 4a to display all those items at once. Accordingly, three menu screens (recording menu (1) to recording menu (3)) can be separately displayed, so that the user can select one of recording menus (1)-(3) by operating the cursor key 8e.

Recording menus (1)-(3) are described below in detail. As shown in FIG. 9(a), the screen of recording menu (1) has six menu items prepared: "MOVIE", "PHOTO", "SCENE SELECT", "FILTER", "FLASH", and "SELF-TIMER". In the state of FIG. 9(a), when the cursor key 8e is depressed for setting, mode setting in the item of "MOVIE" will be possible.

As shown in FIG. 9(b), there are seven setting modes of the item "MOVIE": a FULL-HD mode with a resolution of 1920×1080 and a frame rate of 60 fields/sec, an HD-HR mode with a resolution of 1280×720 and a frame rate of 60 frames/sec, an HD-SHQ mode with a resolution of 1280×720 and a frame rate of 30 frames/sec, a TV-HR mode with a resolution of 640×480 and a frame rate of 60 frames/sec, a TV-SHQ mode with a resolution of 640×480 and a frame rate of 30 frames/sec, a web-SHQ mode with a resolution of 320×240 and a frame rate of 30 frames/sec, and a voice memo mode for recording only voice. One mode can be selected from these modes by operating the cursor key 8e downward and performing a set operation. It is noted that the web-SHQ mode and voice memo mode are not displayed in FIG. 9(b). This is because there are a large number of modes and therefore they cannot be displayed all at once. The web-SHQ mode and voice memo mode can be displayed by operating the cursor key 8e downward to scroll the screen. The FULL-HD mode with a resolution of 1920×1080 and the HD-HR mode and HD-SHQ mode of 1280×720 both correspond to so-called high vision images, the screen aspect ratio of which is 16:9. The TV-HR mode and TV-SHQ mode with a resolution of 640×480 both correspond to normal TV images, the screen aspect ratio of which is 4:3. The web-SHQ mode with a resolution of 320×240 is a mode prepared for easily creating files in creating a blog on a personal computer.

When the cursor key 8e is operated downward from the menu display of FIG. 9(a), where the cursor is in "MOVIE" in the top position, the cursor moves to the item of "PHOTO" as shown in FIG. 9(c). The item "PHOTO" has nine settable modes as shown in FIG. 9(d): an 8M mode in which captured still images have an 8 MB file size with a resolution of 3264×2448, a 4M-H mode of low compression rate in which the resolution is 2288×1712 and the file size is 4M, a 4M-S mode in which images are compressed with a higher compression rate than that of the 4M-H mode and have the same resolution of 2288×1712 and a file size of 4 MB, a 3.5M mode in which the resolution is 2496×1408 and the file size is 3.5 MB, a 2M mode in which the resolution is 1920×1080 and the file size is 2 MB, a 2M(B) mode in which the resolution is 1600×1200 and the file size is 2 MB, a 0.9M mode in which the resolution is 1280×720 and the file size is 0.9 MB, a 0.3M mode in which the resolution is 640×480 and the file size is 0.3 MB, and a sequential shooting mode. One mode can be selected from these modes by operating the cursor key 8e.

It is noted that the 2M(B) mode, 0.9M mode, 0.3M mode and sequential shooting mode are not displayed in FIG. 9(d). This is because there are a large number of modes and therefore they cannot be displayed all at once. The 2M(B) mode, 0.9M mode, 0.3M mode and sequential shooting mode can be displayed by operating the cursor key 8e downward to scroll the screen. The 3.5M mode and 2M mode have an aspect ratio of 16:9 and correspond to high vision. The 4M-S mode, 4M-H mode, and 2M(B) mode have an aspect ratio of approximately 4:3 and correspond to normal TV images. The 0.3M mode maintains an aspect ratio of 4:3, but has a smaller file size than that of the others, so that the file can be easily used for a blog or the like.

In transitions of each menu in each drawing of the present embodiment, the representation "SET" means a set operation of the cursor key 8e, "MENU" a depression of the menu button 8d, ▲ an upward operation of the cursor key 8e, ▼ a downward operation of the cursor key 8e, "RIGHT BUTTON" a rightward operation of the cursor key 8e, and "LEFT BUTTON" a leftward operation of the cursor key 8e. In order to indicate in which position the cursor is in each item or mode, the item or mode in which the cursor is positioned is shown by a solid frame surrounding it.

Although not illustrated, "SCENE SELECT" includes a full auto mode, sports mode, portrait mode, night view portrait mode, snow and beach mode, fireworks mode, and lamp mode, from which one mode can be selected. The aperture, shutter speed, strobe, etc. are integrally controlled by control data prepared in accordance with each scene. "FILTER" includes a no filter mode, cosmetic mode, monochrome mode, and sepia mode, from which one mode can be selected, so that the special filter effect can be obtained. "FLASH" includes an auto mode, a forced flash mode, and no flash mode, from which one mode can be selected, so that the flash operation of the strobe flash 60 is controlled in accordance with the selected mode. "SELF-TIMER" includes an off mode, a 2 seconds mode, and 10 seconds mode, from which one mode can be selected, so that the self-timer function is controlled in accordance with the selected mode.

As shown in FIG. 10(h), six items are prepared for recording menu (2): "MOVIE STABILIZER", "PHOTO STABILIZER", "FOCUS", "FOCUS SYSTEM", "LIGHT METERING", and "ISO". "MOVIE STABILIZER" includes two modes of an ON mode and OFF mode for turning ON/OFF the camera shake correction for movies. "PHOTO STABILIZER" also includes two modes of an ON mode and OFF mode for turning ON/OFF the camera shake correction for photos. "FOCUS" includes four modes in which the focus range is a total range, normal, manual, and a macro mode. "FOCUS SYSTEM" includes two modes of a 9-point range finder focus and spot focus. "LIGHT METERING" includes three modes of a multi-section, center-weighted, and spot modes. "ISO" has eight modes prepared: Auto, 50, 100, 200, 400, 800, 1600, and 3200. For each item, one mode is selected and set from the prepared modes, allowing setting of desired recording conditions.

As shown in FIG. 10(j), five items are prepared for recording menu (3): "WHITE BALANCE", "EXPOSURE", "DIGITAL ZOOM", "FACE CHASER", and "HIGH SENSITIVITY". "WHITE BALANCE" includes six modes of an auto, a fair, a cloudy, a fluorescent, an incandescent, and a one push modes. "EXPOSURE" includes four modes of a program, a shutter priority, an aperture priority, and a manual modes. "DIGITAL ZOOM" includes two modes of an ON and OFF modes. "FACE CHASER", which is for detecting the subject's face and controls focusing and exposure for this face, includes two modes of an ON and OFF modes. "HIGH SENSITIVITY" has two modes prepared, an ON and OFF modes. For each item, one mode is selected and set from the prepared modes, allowing setting of desired recording conditions.

The menu screen of FIG. 10(a) has tags A1 to A3 of each recording menu displayed on the left side thereof. Under tag A3 of recording menu (3), tags C1 to C3 of option menus (1) to (3) described below are displayed. The option menus are to set various conditions associated with option functions added to recording conditions or playback conditions. Option menu (1) includes six items: "CLOCK SET", "INFO DISPLAY", "STARTUP DISPLAY", "OPERATION BEEP", "POST VIEW", and "REC FOLDER". "CLOCK SET" is an item for inputting the date and time. "INFO DISPLAY" is an item for determining whether all the parameters are to be displayed on the screen, or the date and time information is to be displayed. "STARTUP DISPLAY" is an item for determining whether a preset startup display is to be displayed or not. "OPERATION BEEP" is an item for selecting various operation sounds from predetermined sounds. "POST VIEW" is an item for specifying the duration for checking the captured image. "REC FOLDER" is an item for specifying the folder in which the recorded image is to be stored. Conditions in each item are set with menu display.

Option menu (2) includes six items: "SHORTCUTS", "NOISE REDUCTION", "IMAGE SETTINGS", "FLICKER REDUCT", "MONITOR BRIGHTNESS", and "EXTERNAL MIKE VOLUME". "SHORTCUTS" is to set shortcuts to be assigned with the cursor key 8e. "NOISE REDUCTION" is to set ON or OFF the noise reduction in each of moving images, still images, and voice. "FLICKER REDUCT" is to set ON or OFF the flicker-reduction function. "MONITOR BRIGHTNESS" is to set the brightness of the monitor. "EXTERNAL MIKE VOLUME" is an item for setting the volume of the external mike. In conditioning menus are displayed in one hierarchy or two hierarchies.

Option menu (3) includes six items: "LANGUAGE", "TV OUTPUT", "POWER SAVE", "FILE NO", "FORMAT", and "RESET SETTINGS". "LANGUAGE" is an item for selecting the screen language from a plurality of languages including Japanese and English. "TV OUTPUT" is an item for choosing NTSC/PAL or the wide screen or not. "POWER SAVE" is an item for specifying the elapsed time before the power save is activated at the time of recording or playback. "FILE NO" is an item for determining from which NO the file NO begins when a card is replaced. "FORMAT" is an item for determining whether a simple or full formatting is executed or not. "RESET SETTINGS" is an item for determining whether the parameters are reset to the factory-preset settings.

Next described is how to set a mode of each item associated with recording in the normal menu mode. As shown in FIG. 9(a), recording menu (1) is displayed on the monitor 4a by operating the menu button 8d with the monitor 4a displaying the through-the-lens image in the recording mode. When there is an item that the user desires to set or change in recording menu (1), the user operates the cursor key 8e upward or downward for a short time. In other words, the user inclines the cursor key 8e upward or downward for a short time and thereafter immediately returns it to the neutral position (does a short time operation). This causes the cursor to move down sequentially by only one item in recording menu 1 as shown in FIGS. 9(a), (c), (e), (f), and (g). When this operation is repeated and the cursor reaches the bottom item of recording menu (1), the cursor moves to the top item of the recording menu. As long as the short push is repeated, the cursor will circulate through the six items of recording menu TAB 1. For example, when the cursor is in the position of "MOVIE" on recording menu (1) as shown in FIG. 9(a), the cursor moves, each time the downward short time operation is performed, to "PHOTO"→"SCENE SELECT"→"FILTER"→"FLASH" "SELF-TIMER"→"MOVIE"→"PHOTO" as shown in FIG. 9(c), (e), (f), and (g), and circulates through the items in recording menu (1). The cursor is moved to a desired item of recording menu (1) in this way by the short time operation. Then depressing the cursor key 8e sets the item, so that a plurality of modes prepared in this item are displayed. Moving the cursor key up or down moves the cursor to a desired mode. Then depressing the cursor key completes setting of the operation mode of the item concerned.

For example, when the user wishes to change or set the resolution in taking moving images, the user at first displays recording menu (1) as shown in FIG. 9(a), and then operates the cursor key 8e to select the item of "MOVIE". Then, as shown in FIG. 9(b), a plurality of modes indicating resolutions for moving images are displayed. Next, the user operates the cursor key 8e to thereby select an item indicating a desired resolution from the modes indicating a plurality of resolutions, and depresses the set key to thereby determine the resolution. Then, the determined resolution is set. In the above description, the cursor is moved down through each item on the screen by operating the cursor key 8e downward, but the cursor can be moved up through each item on the screen by operating the cursor key 8e upward.

Similarly, when the item of "PHOTO" is selected, modes indicating resolutions for still images are displayed as shown in FIG. 9(d). The user selects an item indicating a desired resolution from the modes, and depresses the set key to complete the mode setting.

When there is not a desired item in recording menu (1) and the user wishes to select the desired item from the other recording menus in the normal menu mode, the user switches to recording menu (2) or (3) as follows. With recording menu (1) shown in FIG. 10(a) being displayed, the user operates the cursor key 8e upward or downward instead of the above-described short time operation. In other words, the user inclines the cursor key 8e upward or downward and continues to hold it without returning it to the neutral position (does a long time operation). While the user is continuing this long time operation, the cursor sequentially moves down by one item through the displayed items of recording menu (1) as shown in FIGS. 10(b) to (g). When the cursor reaches the bottom item of recording menu (1), i.e. "SELF-TIMER", the screen moves to recording menu (2) as shown in FIG. 10(i), and the cursor moves to "MOVIE STABILIZER", which is the top item of recording menu (2), and then moves down from there by one item. When the long time operation is further continued and the cursor reaches the bottom item of recording menu (2), i.e. "ISO", the cursor moves to "WHITE BALANCE", which is the top item of recording menu (3) as shown in FIG. 10(k). When the long push is further continued, the cursor moves to "HIGH SENSITIVITY", the bottom of recording menu (3). The user stops the downward operation of the cursor key 8e when the cursor reaches a desired item among the items of recording menus (1) to (3). In this way, the user can reach a desired item quickly.

If the long time operation is continued even when the cursor reaches the bottom item of recording menu (3), then the cursor moves to option menu (1) located under recording menu (3). Then the cursor moves from the top item by one item. After passing through option menu (1), the cursor moves to option menu (2). When the long time operation is further continued, the cursor moves to option menu (3). If the long time operation is continued even when the cursor reaches the bottom item of option menu (3), then the cursor returns to recording menu (1) and sequentially moves down from "MOVIE". In FIG. 10, the cursor movement from (g) to (b) by the downward operation indicates the short time operation, while the long time operation moves the cursor from (g) to (i).

If the user wishes to quickly switch between recording menus (1)-(3), rather than to move the cursor by one item, then the user operates the cursor key 8e leftward to thereby select tabs A1 to A3. It is possible to directly select a recording menu by operating the cursor key 8e upward or downward to thereby select the tab of other recording menus. In this case, after selecting a recording menu by selecting the tab, the user needs to again select an item with the cursor key 8e. This requires an increased number of operations of the cursor key 8e compared with the item selection through all the recording menus with the long time operation.

Figure 5:
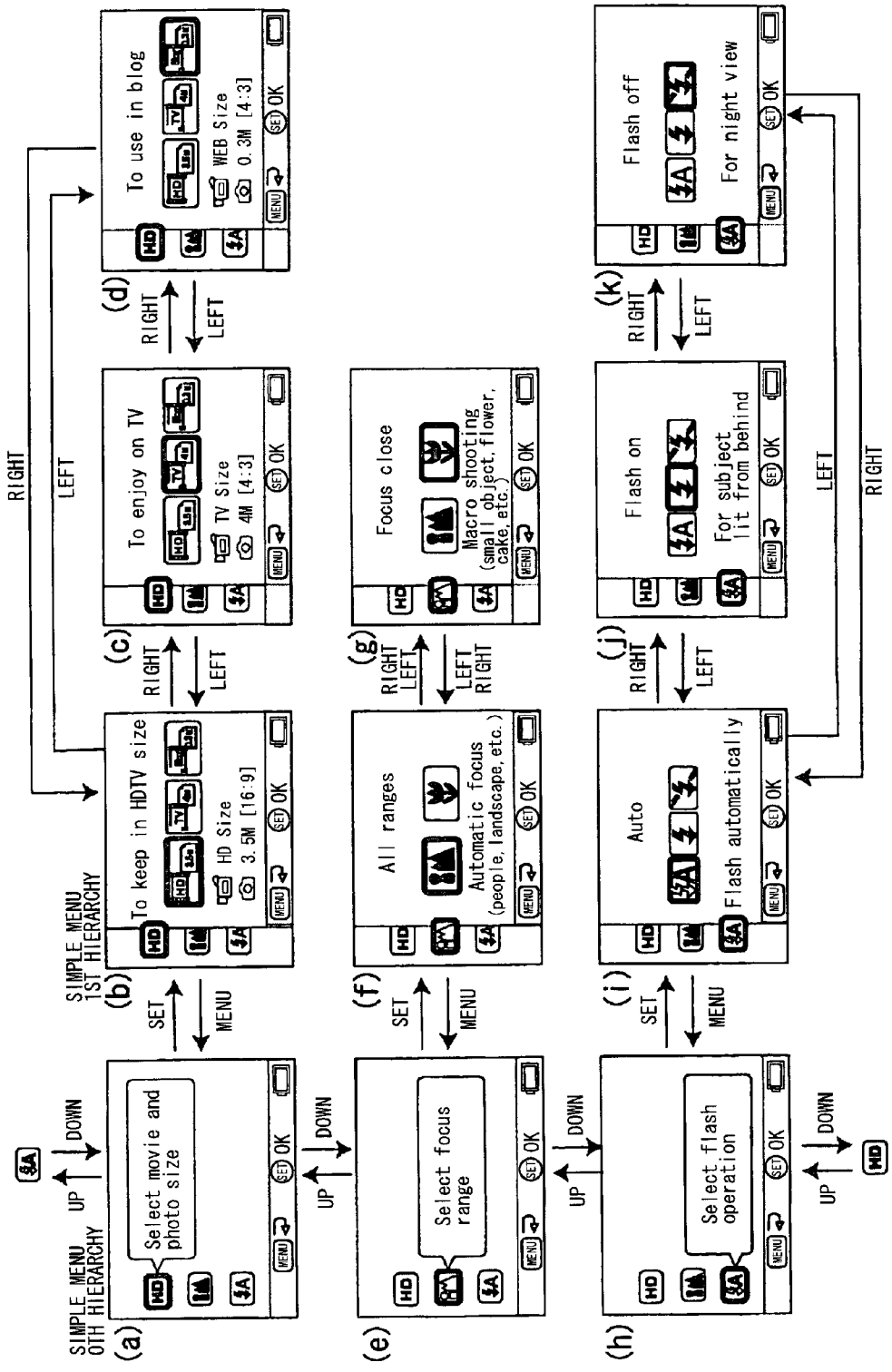
FIG. 5 shows recording simple menu displays of the electronic camera that is an embodiment of the present invention.

When the user moves the menu change-over switch 12 to the X position while the camera is in the recording mode and depresses the menu button 8d, the monitor 4a displays a recording menu selection screen in the simple menu mode shown in FIG. 5. Recording menu selection items in the simple menu mode in the present embodiment includes items included in the recording menu selection items in the above-described normal menu mode or created on the basis of items of the normal menu mode. The simple mode has extremely few selectable items compared with the normal menu mode. In the present embodiment, only a "resolution" menu, "focus" menu and "flash" menu are selectable. The simple menu mode is provided for setting minimum recording menus for the user. This can extremely shorten the time needed to set recording menus compared with selection/setting of the great many items in the normal menu mode.

FIGS. 5(a), (e), and (h) show screens displayed on the monitor 4a when the menu button 8d is depressed. Operating the cursor key 8e upward or downward selects one item from the "resolution" menu, "focus" menu and "flash" menu. This displays a character string describing each menu function.

Here described is the case where the user wishes to change or set the resolution in taking moving images. At first, the cursor key 8e is operated to thereby select an item indicating the "resolution" menu as shown in FIG. 5(a). A setting operation displays three resolution modes as shown in FIG. 5(b). These three resolution modes are "high vision size/3.5 megapixels", "TV size/4 megapixels" and "WEB size/0.3 megapixels". The selectable modes of the resolution item are prepared to provide three main modes each having two items of both "MOVIE" and "PHOTO" in the normal menu. "High vision size/3.5 megapixels" is the FULL-HD mode for moving images, and the 3.5M mode for still images, in which the aspect ratio is 16:9 and the file size is 3.5 MB, and has a resolution suitable for high visions. "TV size/4 megapixels" is the TV-SHQ mode for moving images, and the 4M-S mode for still images, in which the aspect ratio is 4:3 and the file size is 4 MB, and has a resolution suitable for the screen size of common TVs. "WEB size/0.3 megapixels" is the web-SHQ mode for moving images, the 0.3M mode for still images, and suitable for the image size used mainly in blogs. As described, the resolution items in the simple menu mode are each provided by combining two kinds of items of the normal menu mode. That is, main modes are prepared preferable for recording suitable for each of the three types of high vision, TV, and Web. There is no need to prepare two kinds of items for each of moving image taking and still image shooting. This allows recording conditioning for moving image taking or still image shooting corresponding to each of the three types of recording to be extremely easily performed by selecting one from the "resolution" menu of the simple menu mode.

In the menu display in the resolution items, when a set operation by depressing the cursor key 8e is performed, for example, in the state of FIG. 5(b), the mode of "high vision size/3.5 megapixels" is selected. Then, a character string indicating the resolution recommended to the user "To keep in HDTV size" is displayed on the screen in its upper portion. When the cursor key 8e is operated rightward from the state of FIG. 5(b) to move the cursor to the state shown in FIG. 5(c), and then a set operation of the cursor key 8e is performed, the mode of "TV size/4 megapixels" is selected and a character string "To enjoy on TV" is displayed. When the cursor key 8e is operated rightward from the state of FIG. 5(c) to move the cursor to the state shown in FIG. 5(d), and then a set operation is performed, the mode of "WEB size/0.3 megapixels" is selected and a character string "To use in blog" is displayed.

In this way, the cursor key 8e is operated to thereby select/determine a mode for the resolution, and the selected/determined resolution is set. When the moving image recording start button 8b is depressed, a moving image recording process is started with the set resolution. When the still image recording button 8c is depressed, a still image recording process is executed with the set resolution.

When the "focus" menu is to be changed and set, the cursor key 8e is operated downward from the state of FIG. 5(a) to move the cursor to the icon in the middle as shown in FIG. 5(e), and a set operation is performed. Then, as shown in FIG. 5(f), two focus modes are displayed. These focus modes are provided by simplifying the items of "FOCUS" in the normal menu, and consist of two modes of "normal shooting" suitable for general shooting and "macro shooting". A set operation is performed in the state shown in FIG. 5(f) to select the normal shooting and set the parameters so that focus control suitable for general shooting of people or landscape is made. The cursor key 8e is operated rightward from the state of FIG. 5(f) to move the cursor, which results in the display shown in FIG. 5(g). A set operation is performed in this state to select the macro shooting and set the parameters so that focus control suitable for macro shooting is made. In mode setting, a guidance describing each mode is displayed as in the case of the resolution.

When the "flash" menu is to be changed and set, the cursor key 8e is operated downward from the state of FIG. 5(e) to move the cursor to the bottom icon as shown in FIG. 5(h). A set operation is performed in this state to select the flash menu and display three strobe control modes as shown in FIG. 5(i). This flash menu is the same as the items of "FLASH" of the normal menu mode, and one mode can be selected from the three modes. When a set operation is performed in the state shown in FIG. 5(i), the auto flash mode is selected, so that flash/no flash is controlled according to the brightness at the time of shooting, and the light volume then is also adequately controlled. When the cursor key 8e is operated rightward from the state of FIG. 5(i), the cursor shifts to the state shown in FIG. 5(j). When a set operation is performed in this state, the flash ON mode is selected and the parameters are set so that the strobe flash 60 operates regardless of the conditions. Similarly, when the cursor key 8e is operated further rightward from the state of FIG. 5(j) to move the cursor as shown in FIG. 5(k), and then a setting operation is performed, the flash OFF mode is selected and the parameters are set so that the strobe flash does not operate regardless of the conditions. In mode setting, a guidance describing each mode is displayed as in the case of the resolution.

In this way, the user can set the menu easily and quickly by displaying character strings and items easy to understand intuitively for the user, and reducing the number of selection items to simplify the setting to only the conditioning in main recording patterns. This allows a quick recording operation under desired recording conditions.

When the user moves the menu change-over switch 12 to the Y position while the camera is in the playback mode and depresses the menu button 8*d*, the monitor 4*a* displays a playback menu selection screen in the normal menu mode shown in FIG. 4. Playback menu selection items in the normal menu mode are selection items usually prepared in recent electronic cameras.

Since many items are prepared in the playback menu in the normal menu mode, it is difficult for the one screen of the monitor 4*a* to display all those items at once. Accordingly, two screens of playback menus (1) and (2) can be separately displayed, so that the user can select either playback menu (1) or playback menu (2) by operating the cursor key 8*e* leftward/rightward and performing a set operation. Such selection items are hierarchically displayed.

Playback menus (1) and (2) are described below in detail. Playback menu (1) has six items prepared: "SLIDESHOW", "PLAYBACK VOLUME", "PROTECT", "DELETE", "PRINT INSTRUCTIONS", and "ROTATE".

In the item of "SLIDESHOW", files to be played back are selected from all the files, moving image files, and still image files. The transition time is selected from one second, two seconds, three seconds, five seconds, and ten seconds. A transition special effect such as sliding in the next image or the next image appearing from a checkerboard pattern, for example, is selected from a plurality of prepared patterns. Further, whether BGM is to be played or not, and an audio file to be played back, are selected. Set data for these four parameters can be selected and input. Selecting "start" begins slideshow in accordance with the set data.

The item of "PLAYBACK VOLUME" is to slide the playback volume by selecting one of ten stages, for example. The item of "PROTECT" is to choose whether the currently displayed image is to be locked or unlocked. "DELETE" is to choose whether the displayed playback image is to be deleted, or all the unlocked images are to be deleted. The item of "PRINT INSTRUCTIONS" is to specify the number of prints and the like for certain image files or all the image files recorded on the memory card. "ROTATE" is to choose rotating the displayed playback image clockwise or counterclockwise 90 degrees. Playback menu (2) has a screen, not illustrated, in which three menu items, "RESIZE", "EXTRACT STILL", and "EDIT VIDEO", are prepared. The item of "RESIZE" is to select from predetermined sizes a file size of the playback image file currently displayed and whose size is to be changed. The item of "EXTRACT STILL" is to extract a still image file from a moving image file. The item of "EDIT VIDEO" is to cut a portion of a moving image file recorded on the memory card 28 or join a plurality of moving image files together by selecting the moving image file, specifying the cut portion, and selecting the joining position.

Next described is how to set the items associated with playback in the normal menu mode. As shown in FIG. 4(*a*), playback menu (1) is displayed on the monitor 4*a* by operating the menu button 8*d* with the monitor 4*a* displaying a playback image in the playback mode. When there is an item that the user desires to set or change in playback menu (1), this is possible by operating the cursor key 8*e* upward or downward for a short time. That is, the user simply operates the cursor key 8*e* downward for a short time and immediately returns it to the neutral position. This causes the cursor to move down sequentially by only one item in playback menu (1). When this operation is repeated and the cursor reaches the bottom item of playback menu (1), the cursor moves to the top item of playback menu (1). As long as the short time operation is repeated, the cursor will circulate through the six items of playback menu 1. When the cursor is in the position of "SLIDESHOW" on playback menu (1) as shown in FIG. 4(*a*) and a set operation of the cursor key 8*e* is performed, a menu appears for setting various parameters necessary for the item of "SLIDESHOW" as shown in FIG. 4(*b*). When the user operates the cursor key 8*e* upward in this state to move the cursor to "PLAYBACK FILE" as shown in FIG. 4(*c*) and perform a set operation, the cursor moves to the playback file setting position as shown in FIG. 4(*d*). Each time the cursor key 8*e* is operated downward in this state, the file type for slideshow can be set from ALL→PHOTO→MOVIE as shown in FIG. 4(*f*) and FIG. 4(*h*). When this setting is completed, the menu button 8*d* is depressed to return the screen to the state of FIG. 4(*c*). Further, the user operates the cursor key 8*e* downward to select the transition time, transition effect, and BGM as shown in FIGS. 4(*e*) and (*g*). Each setting data can thus be set.

When there is not a desired item in playback menu (1) and the user wishes to select the desired item from the other playback menu in the normal menu mode, the user switches to playback menu (2) as follows. With playback menu (1) shown in FIG. 4(*a*) being displayed, the user continues the long time operation instead of the short time operation. While this is continued, the cursor sequentially moves down by one item through the displayed items of playback menu (1). When the cursor reaches the bottom item of playback menu (1), i.e. "ROTATE", the screen moves to playback menu (2) and the cursor moves to "RESIZE", which is the top item of playback menu (2), and then moves down from there by one item. When the long time operation is further continued, the cursor reaches the bottom item of playback menu (2), i.e. "EDIT VIDEO". The user stops the downward operation of the cursor key 8*e* when the cursor reaches a desired item among the items of playback menus (1) to (2). In this way, the user can quickly reach a desired item. If the long time operation is continued even when the cursor reaches the bottom item of playback menu (2), then the cursor moves to option menu (1), as in the recording menu, located under playback menu (2). Similarly, the cursor moves from the top item by one item. After passing through option menu (1), the cursor moves to option menu (2). When the long push is further continued, the cursor moves to option menu (3). If the long time operation is continued even when the cursor reaches the bottom item of option menu (3), then the cursor returns to playback menu (1) and sequentially moves down from "SLIDESHOW". In FIG. 4, B1 and B2 are tabs of playback menus (1) and (2). As in the recording menu, these tabs can be selected to thereby select the menu.

Figure 6:
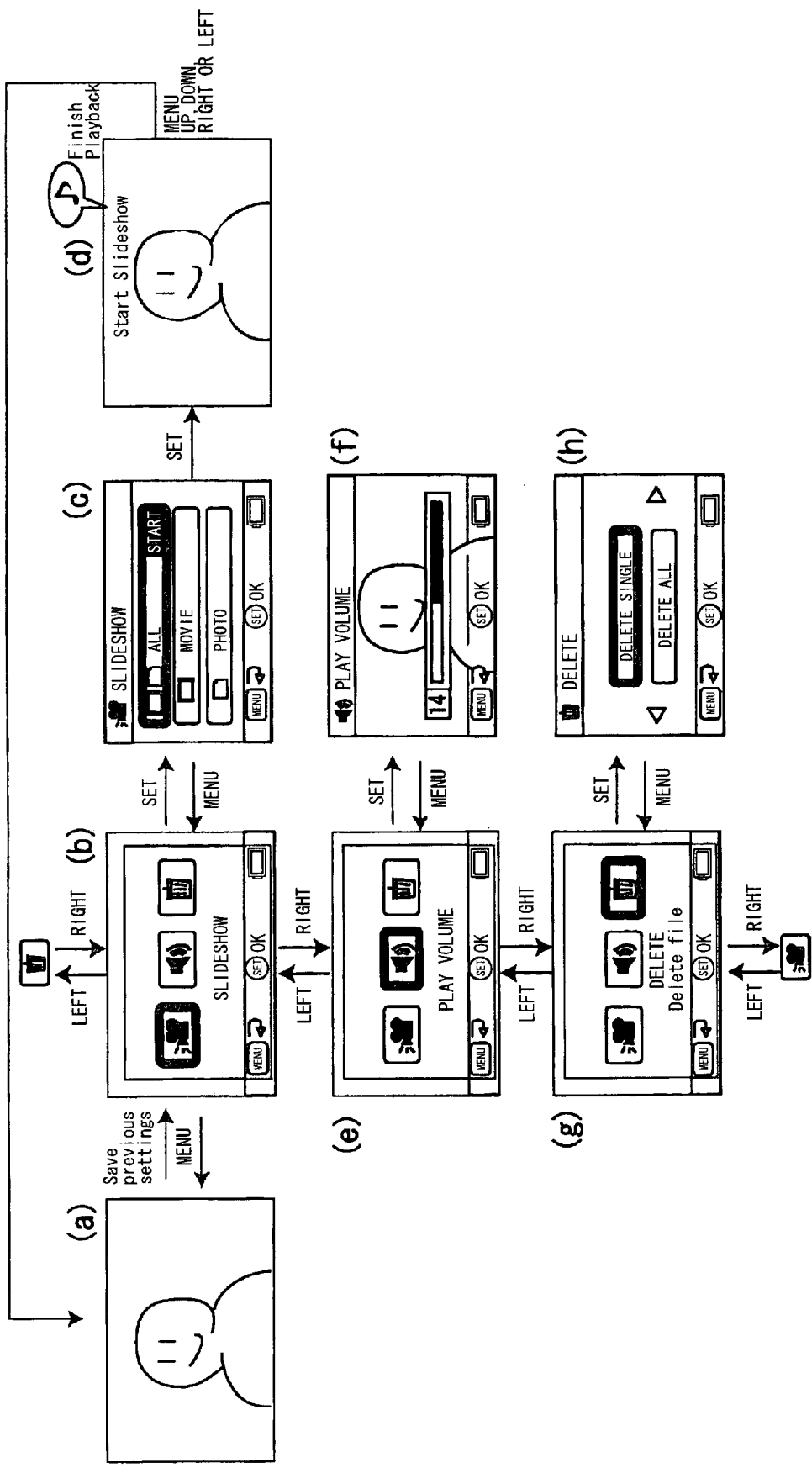
FIG. 6 shows playback simple menu displays of the electronic camera that is an embodiment of the present invention.
Figure 7:
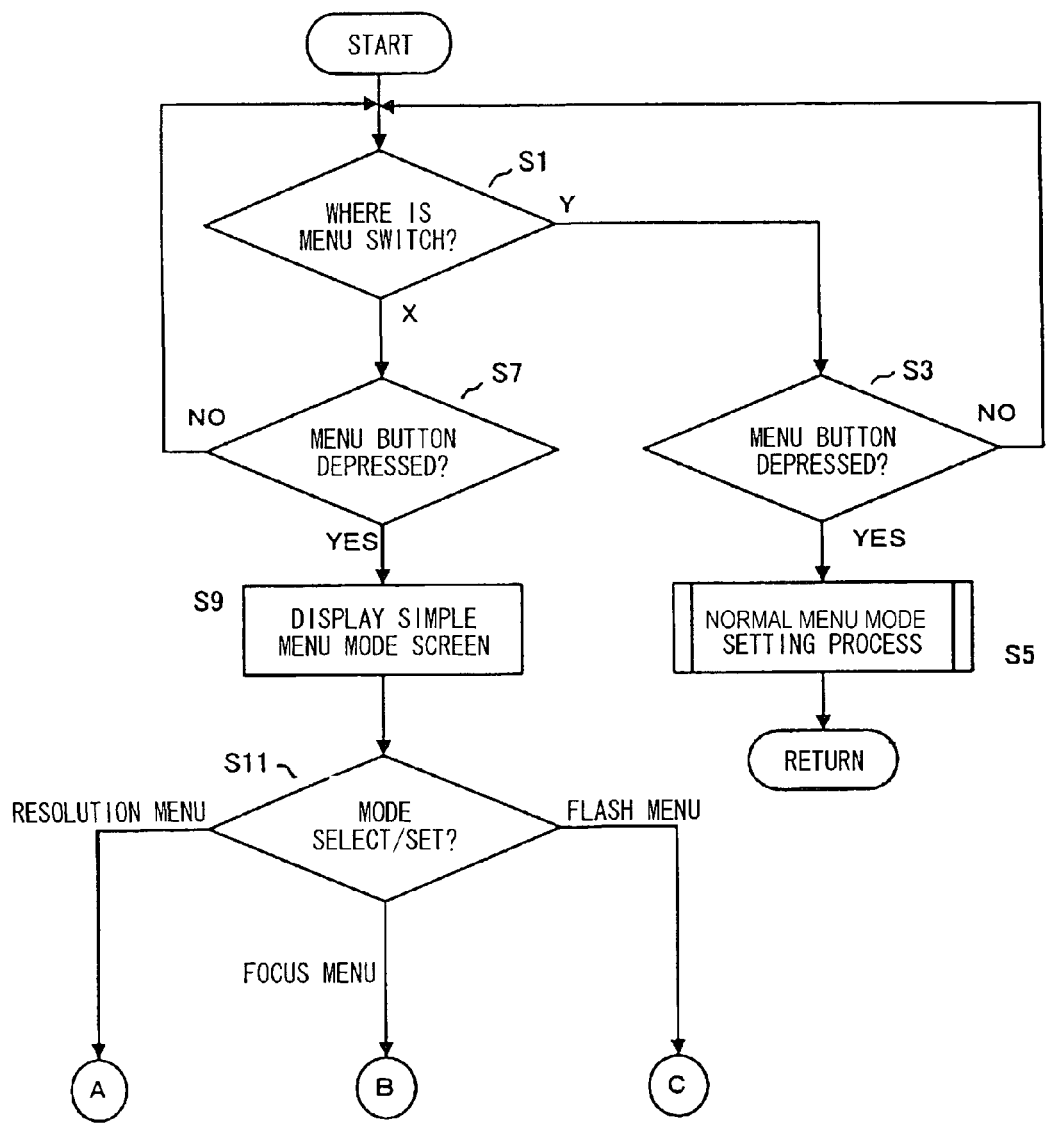
FIG. 7 is a flowchart showing a part of the operation of the electronic camera that is an embodiment of the present invention.

When the user moves the menu change-over switch 12 to the X position to set the simple menu mode during file playback shown in FIG. 6(*a*), and thereafter depresses the menu button 8*d*, the monitor 4*a* displays icon representations of three playback menu items, slideshow, playback volume and delete, as shown in FIG. 6(*b*), (*e*), and (*g*). When the cursor key 8*e* is operated rightward or leftward to thereby move the cursor, a character string is displayed describing the currently selected item. For example, when a set operation with the cursor key 8*e* is performed with the cursor being in the item indicating slideshow as shown in FIG. 6(*b*), the modes of "ALL", "MOVIE" and "PHOTO", which are items for selecting the type of file for the slideshow, are displayed as shown in FIG. 6(*c*). When the mode of "ALL" is selected here, for example, and a set operation is performed, all the files recorded on the memory card 28 are displayed in a slideshow format as shown in FIG. 6(*d*). When the cursor key 8*e* is operated downward from "ALL" to move the cursor to "MOVIE" and then a set operation is performed, a slideshow of moving image files is played. When the cursor is moved to "PHOTO" and then a set operation is performed, a slideshow of still image files is played.

In the case of changing or setting the playback volume, the cursor is moved to the item of playback volume as shown in FIG. 6(*e*), and then a set operation is performed. The user sets the playback volume to a desired volume as shown in FIG. 6(*f*) by operating the cursor key 8*e* rightward and leftward, and performs a set operation to set the volume.

In the case of deleting images, when the cursor is moved to the item of delete as shown in FIG. 6(*g*) and a set operation is performed, "DELETE SINGLE" for deleting one file and "DELETE ALL" for deleting all files are displayed as shown in FIG. 6(*h*). For example, when the cursor key 8*e* is operated to move the cursor to "DELETE ONE" and a set operation is performed, the file currently played back is deleted. When the cursor is moved to "DELETE ALL" and thereafter a set operation is performed, all the files recorded on the memory card 28 are deleted.

Next, a menu setting processing to execute the above-described processes at the CPU 22 is described in detail using FIG. 7, FIG. 8, and FIG. 11 to FIG. 16. At first, with reference to FIG. 7, the recording menu setting process in the recording mode is described.

When the recording/playback mode switch 8*a* is moved to the P position, the CPU 22 proceeds to step S1 to determine whether the menu change-over switch 12 is in the X position or is in the Y position. When it is determined here that the menu change-over switch 12 is in the Y position, the process proceeds to step S3 to determine whether the menu button 8*d* is depressed or not. Step S1 and step S3 repeat until it is determined that the menu button is depressed. When it is determined that the menu button is depressed (YES), the process proceeds to step S5. In step S5, the recording menu setting process in the normal menu mode is executed. When this setting process ends, the process returns to step S1.

When it is determined in step S1 that the menu change-over switch 12 is in the X position, the process proceeds to step S7 to determine whether the menu button 8*d* is depressed or not. Step S1 and step S7 repeat until it is determined that the menu button is depressed. When it is determined that the menu button is depressed (YES), the process proceeds to step S9. In step S9, the simple menu mode screen shown in FIG. 5(*a*) is displayed on the monitor 4*a*. Next comes step S11 to determine which item is selected/set from the three recording menu items, which are the resolution menu, focus menu and flash menu.

Figure 8:
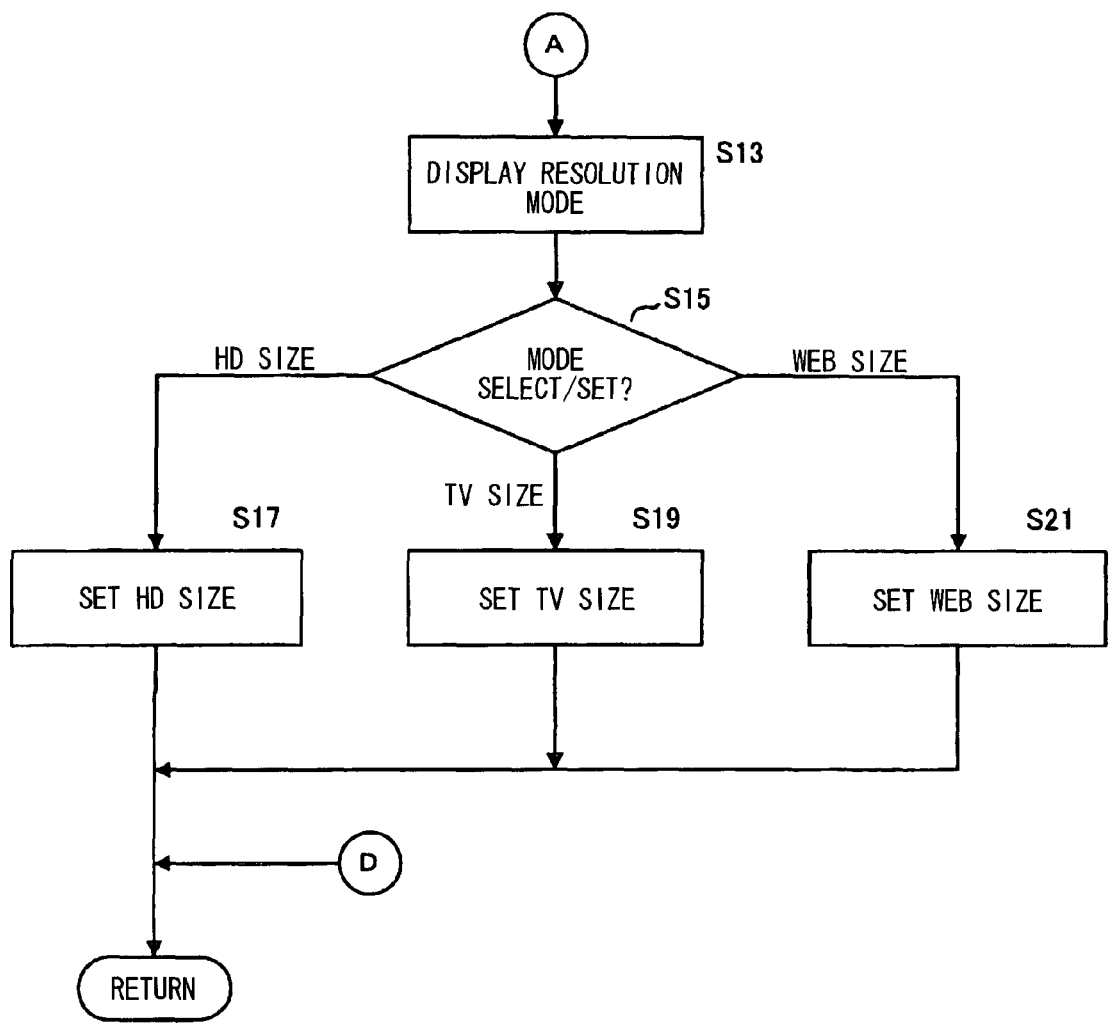
FIG. 8 is a flowchart showing another part of the operation of the electronic camera that is an embodiment of the present invention.

When it is determined in step S11 that the resolution menu is selected/set, the process proceeds to step S13 of FIG. 8 to display on the monitor 4*a* the three resolution modes as shown in FIG. 5(*b*), which are the modes of high vision size/3.5 megapixels, TV size/4 megapixels and WEB size/0.3 megapixels. The process then proceeds to step S15. In step S15, it is determined which mode is selected/set from the three resolution modes.

When it is determined in step S15 that the high vision size/3.5 megapixels is selected/set, the process proceeds to step S17 to set the resolution to the high vision size/3.5 megapixels. When it is determined that the TV size/4 megapixels is selected/set, the process proceeds to step S19 to set the resolution to the TV size/4 megapixels. Similarly, when it is determined that the WEB size/0.3 megapixels is selected/ set, the process proceeds to step S21 to set the resolution to the WEB size/0.3 megapixels. When the setting process execution is finished in step S17, step S19, or step S21, the process returns to step S1.

Figure 11:
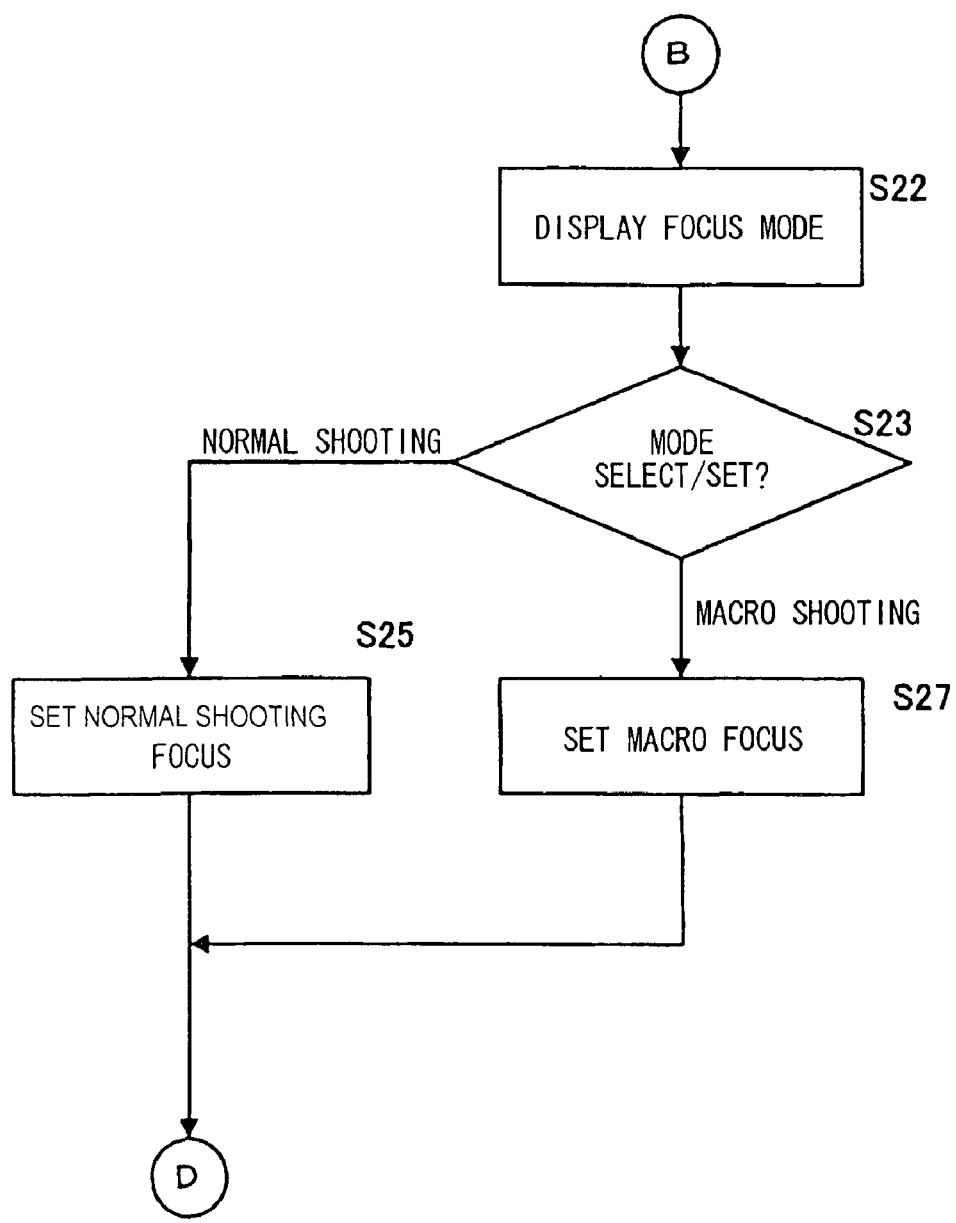
FIG. 11 is a flowchart showing another part of the operation of the electronic camera that is an embodiment of the present invention.

When it is determined in step S11 that the focus menu is selected/set, the process proceeds to step S22 of FIG. 11 to display on the monitor 4*a* the two modes in the item of focus as shown in FIG. 5(*f*), which are the modes for normal shooting and macro shooting.

Next comes step S23 to determine which mode of the focus item is selected/set. When it is determined in step S23 that the normal shooting mode is selected/set, the process proceeds to step S25 to set the focus setting to the normal shooting focus mode. Alternatively, when it is determined in step S23 that the macro focus mode is selected/set, the process proceeds to step S27 to set the focus setting to the macro focus mode. When the setting process execution is finished in step S25 or step S27, the process returns to step S1.

Figure 12:
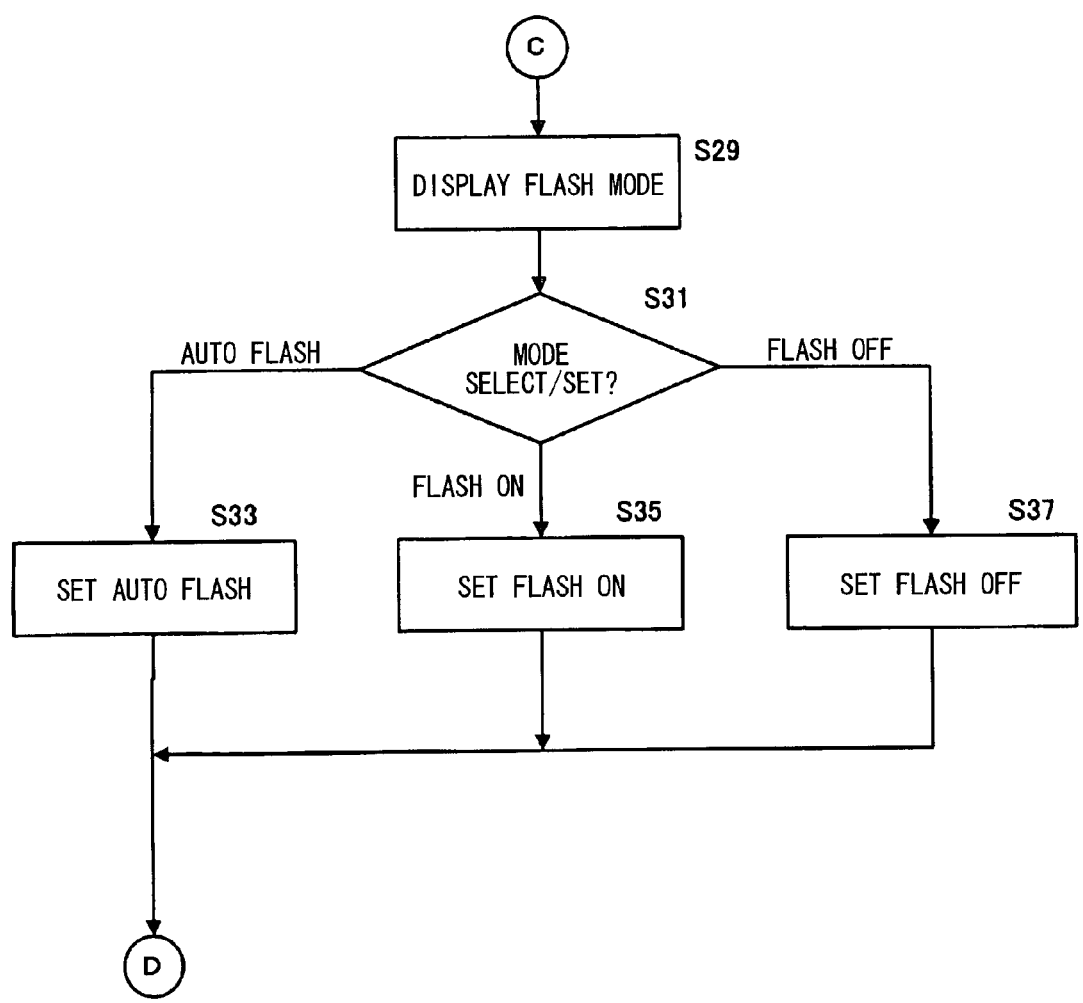
FIG. 12 is a flowchart showing another part of the operation of the electronic camera that is an embodiment of the present invention.
Figure 13:
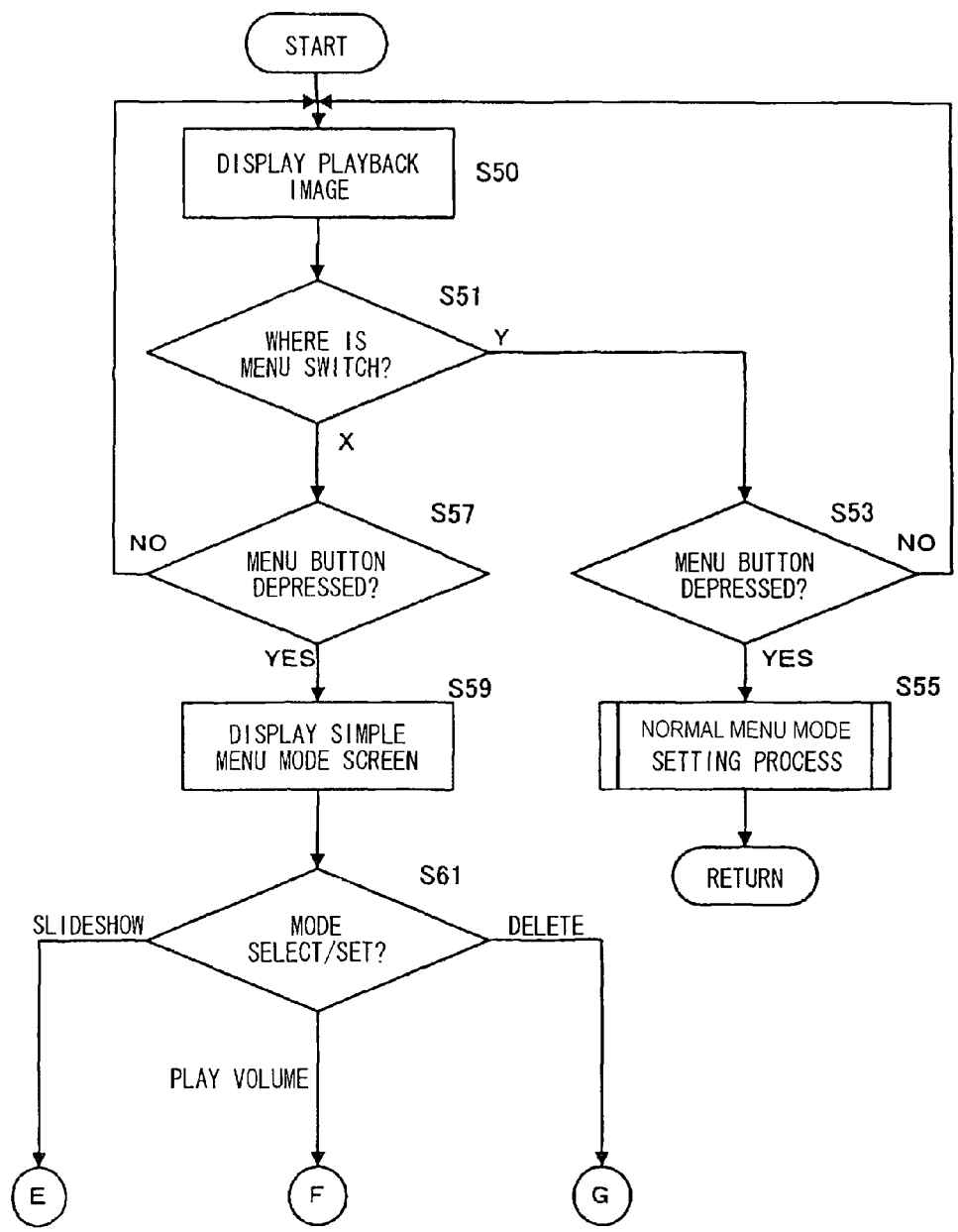
FIG. 13 is a flowchart showing a part of the operation of the electronic camera that is an embodiment of the present invention.

When it is determined in step S11 that the flash menu is selected/set, the process proceeds to step S29 of FIG. 12 to display the three flash modes as shown in FIG. 5(*i*), which are the auto flash mode, always flash ON mode, and always flash OFF mode. Next comes step S31 to determine which mode is selected/set from the three flash modes. When it is determined in step S31 that the auto flash mode is selected/set, the process proceeds to step S33 to set the flash to the auto flash mode. When it is determined in step S31 that the always flash ON mode is selected/set, the process proceeds to step S35 to set the flash to the always flash ON mode. Alternatively, when it is determined in step S31 that the always flash OFF mode is selected/set, the process proceeds to step S37 to set the flash to the always flash OFF mode. When the setting process execution is finished in step S33, step S35 or step S37, the process returns to step S1.

Next, with reference to FIG. 13 to FIG. 16, the playback menu setting process in the playback mode is described. When the recording/playback mode switch 8*a* is moved to the Q position, the CPU 22 causes the monitor 4*a* to display the playback image shown in FIG. 6(*a*) in step S50. Next comes step S51 to determine whether the menu change-over switch 12 is in the X position or is in the Y position. When it is determined here that the menu change-over switch 12 is in the Y position, the process proceeds to step S53 to determine whether the menu button 8*d* is depressed or not. Step S51 and step S53 repeat until it is determined that the menu button is depressed. When it is determined that the menu button is depressed (YES), the process proceeds to step S55. In step S55, the playback menu setting process in the normal menu mode is executed. When this setting process ends, the process returns to step S50.

When it is determined in step S51 that the menu change-over switch 12 is in the X position, the process proceeds to step S57 to determine whether the menu button 8*d* is depressed or not. Step S51 and step S57 repeat until it is determined that the menu button is depressed. When it is determined that the menu button is depressed (YES), the process proceeds to step S59. In step S59, the simple menu mode screen shown in FIG. 6(*b*) is displayed on the monitor 4*a*. Next comes step S61 to determine which item is selected/ set from the three playback menu items, which are the slide-show menu, playback volume menu and delete menu.

Figure 14:
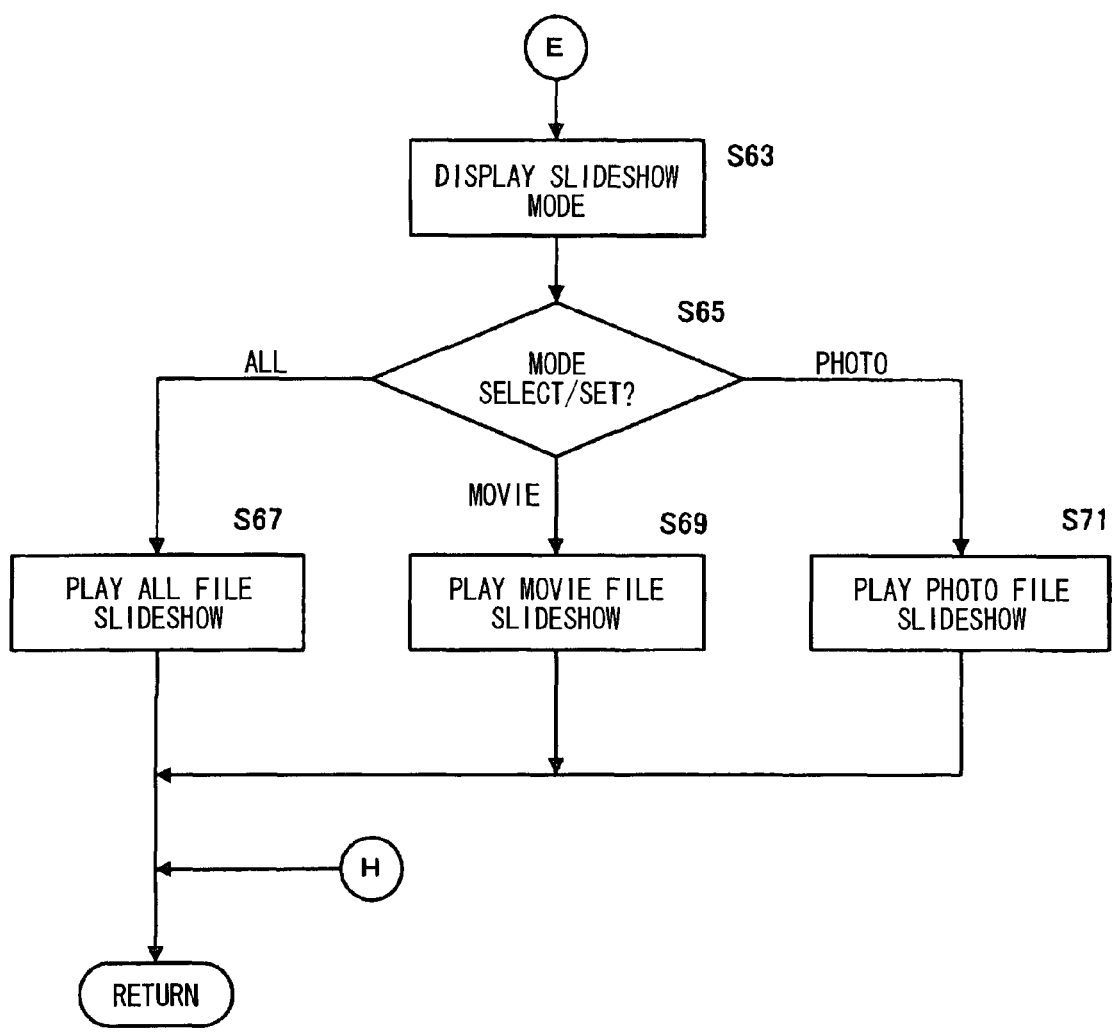
FIG. 14 is a flowchart showing another part of the operation of the electronic camera that is an embodiment of the present invention.

When it is determined in step S61 that the item of slide-show is selected/set, the process proceeds to step S63 of FIG. 14 to display on the monitor 4*a* the three slideshow modes as shown in FIG. 6(*c*), which are "ALL", "MOVIE" and "PHOTO". The process then proceeds to step S65. In step S65, it is determined which mode is selected/set from the three slideshow modes.

When it is determined in step S65 that "ALL" is selected/set, the process proceeds to step S67 to play back and display all the files on the monitor 4a in a slideshow format. When it is determined in step S65 that "MOVIE" is selected/set, the process proceeds to step S69 to play back and display all the movie files on the monitor 4a in a slideshow format. Alternatively, when it is determined in step S65 that "PHOTO" is selected/set, the process proceeds to step S71 to play back and display all the still image files on the monitor 4a in a slideshow format. When the slideshow is finished or stopped in step S67, step S69 or step S71, the process returns to step S50.

Figure 15:
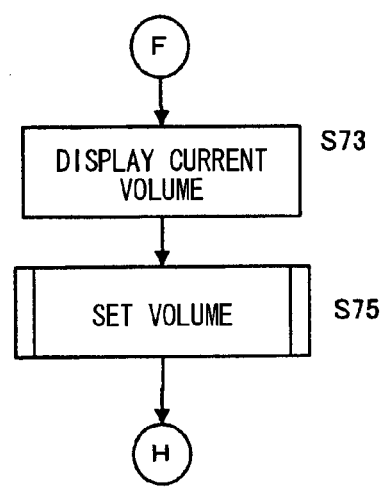
FIG. 15 is a flowchart showing another part of the operation of the electronic camera that is an embodiment of the present invention.

When it is determined in step S61 that the item of playback volume is selected/set, the process proceeds to step S73 of FIG. 15 to display on the monitor 4a a bar indicating how much the current playback volume is as shown in FIG. 6(f). Next comes step S75 to set the playback volume in accordance with the operation of the cursor key 8e. The process then returns to step S50.

Figure 16:
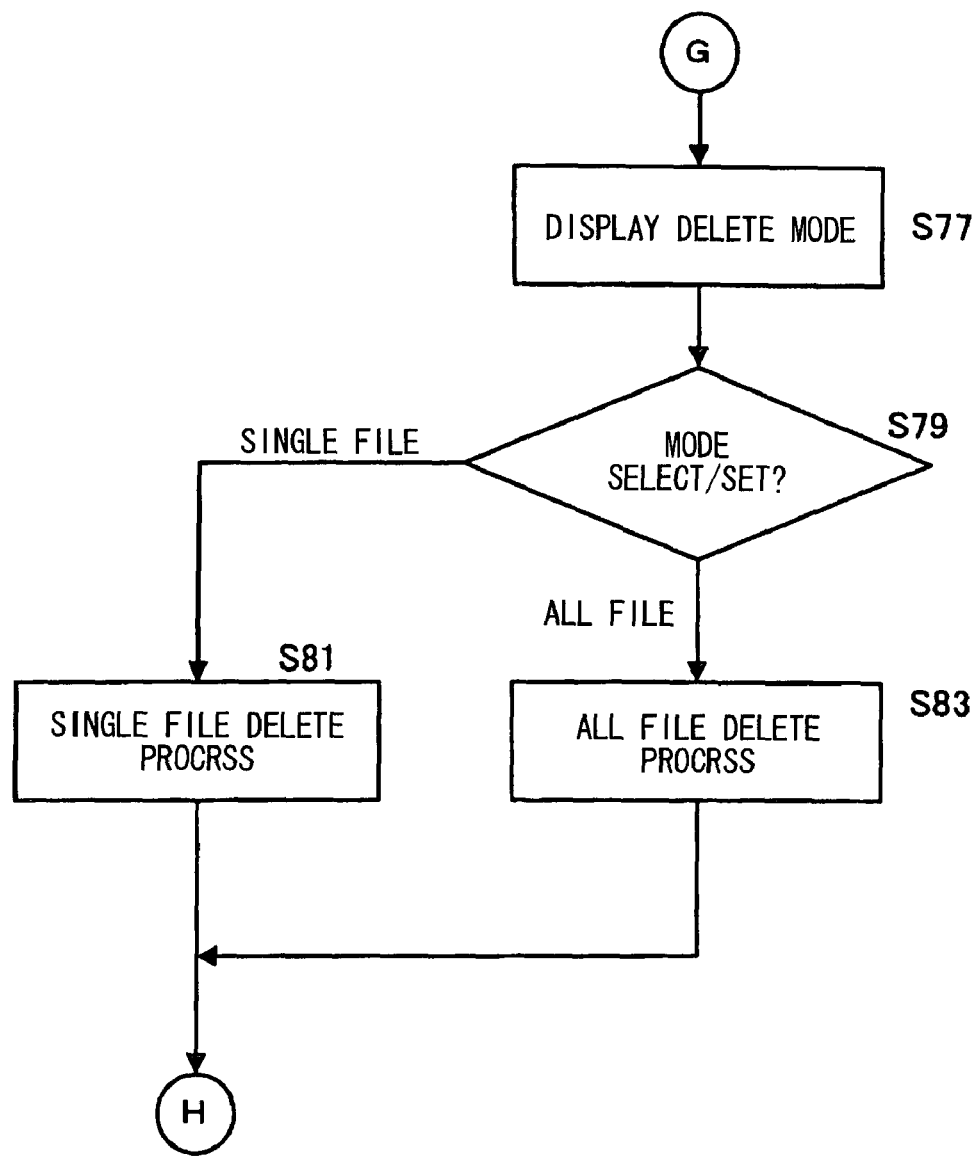
FIG. 16 is a flowchart showing another part of the operation of the electronic camera that is an embodiment of the present invention.

When it is determined in step S61 that the item of delete is selected/set, the process proceeds to step S77 of FIG. 16 to display on the monitor 4a the two kinds of delete modes as shown in FIG. 6(h), which are the mode names of "DELETE SINGLE" and "DELETE ALL". The process then proceeds to step S79.

In step S79, it is determined which mode is selected/set from the two delete modes. When it is determined in step S79 that the mode of "DELETE SINGLE" is selected/set, the process proceeds to step S81 to delete the file played back and displayed in step S50. When it is determined in step S79 that the mode of "DELETE ALL" is selected/set, the process proceeds to step S83 to delete all the files recorded on the memory card 28. When the delete process is finished in step S81 or step S83, the process returns to step S50. It is noted that after all the files are deleted in step S83, no image is displayed in the playback image display process in step S50.

As described, with the electronic camera 10 of the present embodiment, the menu display on the monitor is switched by the menu change-over switch 12 near the monitor 4a between the items in the normal menu setting and the items in the simple menu setting, which are fewer than those of the normal menu setting and easy to intuitively understand. The user can thus certainly and extremely easily set recording conditions or playback conditions in conformity with the use condition while viewing the display on the monitor 4a.

In addition, the monitor 4a and menu change-over switch 12 are not exposed when the finder unit 4 is returned from the state of FIG. 1 (c) to the closed state of FIG. 1(a). Since the menu change-over switch 12 is provided inherently in order to be used only for switching the display menu on the monitor 4a, the operation of the menu change-over switch 12 is prevented in the closed state of the finder unit 4, where it is not necessary to use the monitor 4a. Unnecessary operations of the switch 12 are thus prevented, and also the camera presents a neat appearance in that unnecessary parts are not exposed.

In the above embodiment, switching between the normal menu mode and simple menu mode with the menu change-over switch 12 is described as performed from the state in which the monitor 4a displays a taken image or playback image. However, this is not the only case. For example, the screen can be directly shifted to the simple menu mode from a menu display in the normal menu mode by operating the menu change-over switch 12.

In the above embodiment, the cursor key 8e is operated in four directions, and depressed for setting in the neutral position. However, a separate set button can of course be provided for a set function.

What is claimed is:

1. An information display device comprising:
   a monitor;
   a menu switcher for switching between a first menu mode in which a first group of items is displayed in a menu on the monitor, and one of certain first candidates of data can be selected as first control data for each of the items, and a second menu mode in which a second group consisting of fewer items than the first group is displayed in a menu on the monitor, and one of certain second candidates of data can be selected as second control data for each of the items;
   a controller for controlling the operation of the device on the basis of the first control data or second control data, wherein the second group of items includes an item having a second candidate of data that is a combination of first candidates of data for a plurality of particular items of the first group; and
   an imager for taking a still image of a subject in response to imaging instructions in a still image taking mode, and for taking a moving image of a subject in response to imaging instructions in a moving image taking mode, wherein the first group of items includes a group of moving image items associated with recording conditions for the moving image and a group of still image items associated with recording conditions for the still image, wherein the second candidate of data is the data that is a combination of each first candidate of data selected from the group of moving image items and from the group of still image items.

2. The information display device according to claim 1, wherein the plurality of particular items include an item associated with the resolution included in the group of moving image items and an item associated with the aspect ratio included in the group of still image items.

* * * * *